United States Patent [19]

O'Brien et al.

[11] Patent Number: 4,815,914

[45] Date of Patent: Mar. 28, 1989

[54] MATERIAL STORAGE AND DELIVERY SYSTEM

[76] Inventors: Michael J. O'Brien, 227 Oneida, Pontiac, Mich. 48053; Francis V. Palazzolo, 35707 Alta Vista; Wayne T. Polachowski, 35731 Alta Vista, both of Sterling Heights, Mich. 48077

[21] Appl. No.: 874,150

[22] Filed: Jun. 13, 1986

Related U.S. Application Data

[62] Division of Ser. No. 620,165, Jun. 13, 1984, Pat. No. 4,595,330.

[51] Int. Cl.[4] .............................................. B65G 65/02
[52] U.S. Cl. .................................... 414/276; 414/285; 414/286
[58] Field of Search ............... 414/276, 285, 286, 639, 414/648, 649; 193/35 R

[56] References Cited

U.S. PATENT DOCUMENTS

| | | | |
|---|---|---|---|
| 2,096,958 | 10/1937 | Clerc | 414/276 |
| 2,296,683 | 9/1942 | Morgan et al. | 414/276 X |
| 2,942,716 | 6/1960 | Stone | 193/35 R |
| 3,674,159 | 7/1972 | Lemelson | 414/276 |

FOREIGN PATENT DOCUMENTS

1382511  3/1965  France .................. 414/286

*Primary Examiner*—Robert J. Spar
*Assistant Examiner*—D. Glenn Dayoan
*Attorney, Agent, or Firm*—Harness, Dickey & Pierce

[57] ABSTRACT

A material storage and delivery structure and system having a first container storage rack for accumulating and storing full containers of parts, and a container indexing and transfer mechanism for delivering individual full containers from the first storage rack to an assembly line work station. The transfer mechanism is also operative to move empty containers from the work station to a second container storage rack for accumulating and storing empty or depleted containers. A full container loading station and an empty container unloading station are provided for delivering full containers to the first rack and removing empty containers from the second rack as desired. Movement of containers the loading station toward the transfer mechanism and from the transfer mechanism to the unloading station is effected by positive gravity flow rails disposed along each storage rack. The transfer mechanism also includes gravity flow rails to facilitate indexing of containers onto and from the storage racks. The full and empty container storage racks can be provided in over-under, under-over and side-by-side configurations. The system can also be provided in a closed loop configuration. Each of the configurations can be provided with side shuttle mechanisms for indexing and moving containers to and from intermediate work stations disposed laterally of individual storage racks.

1 Claim, 14 Drawing Sheets

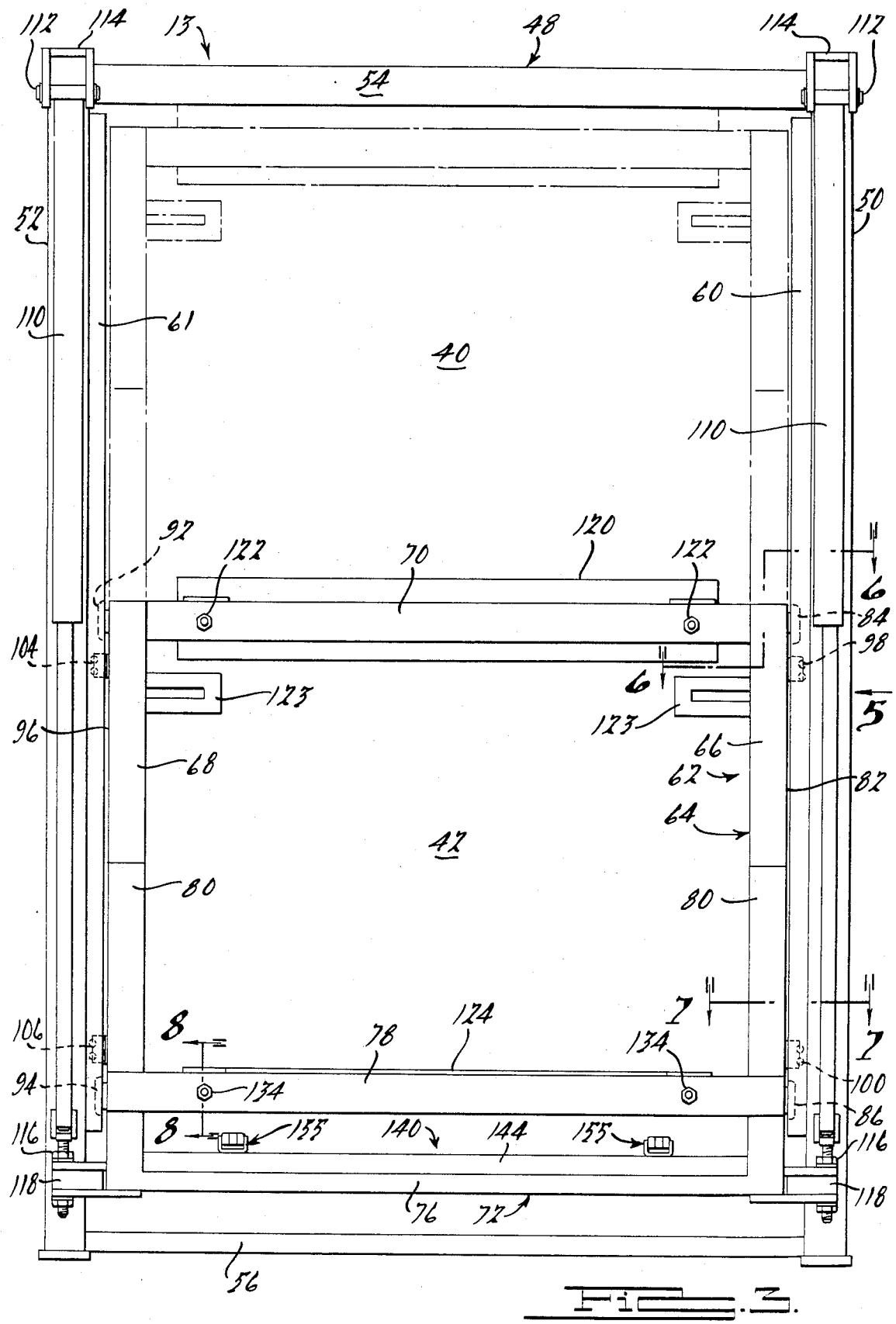

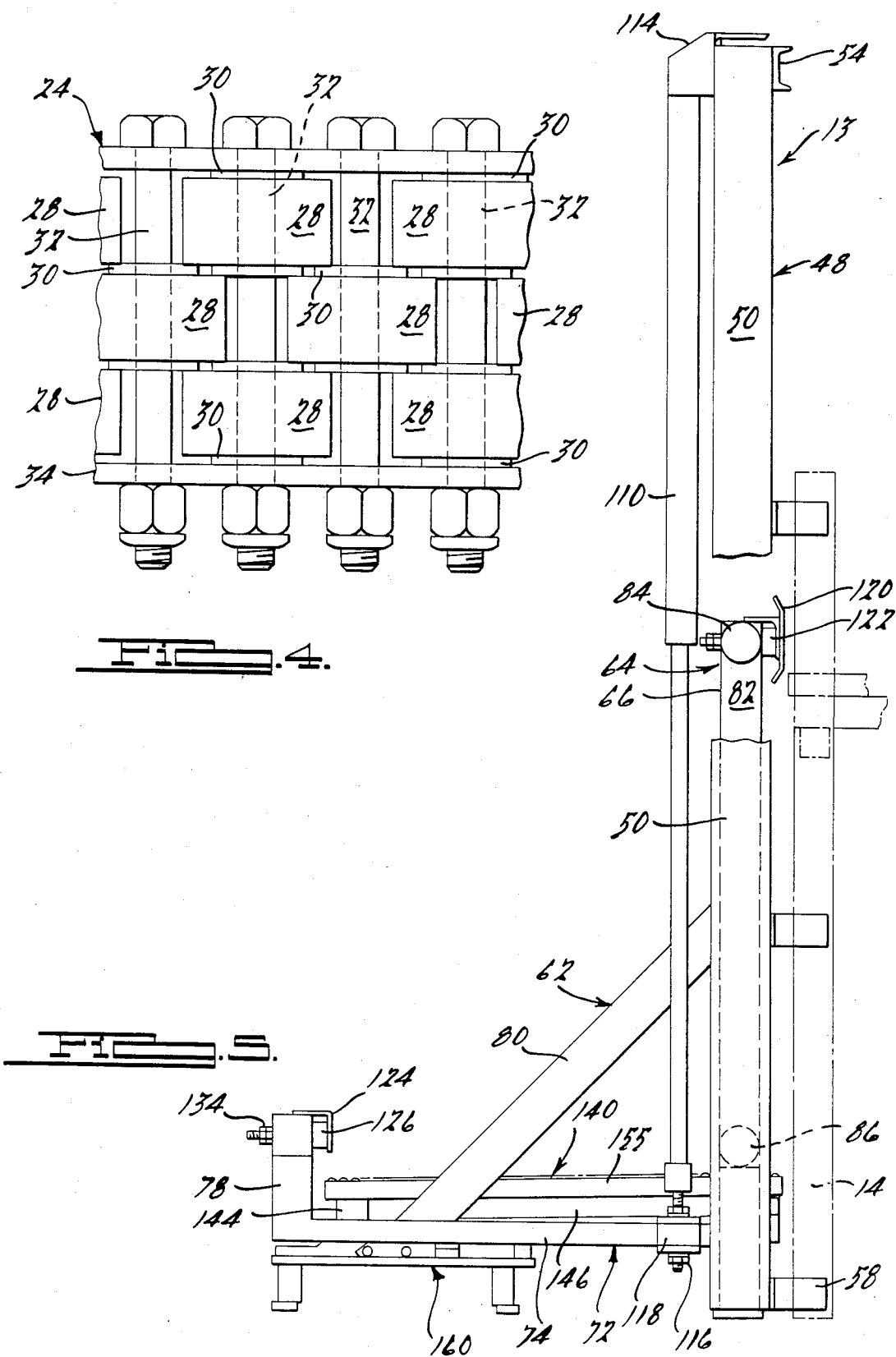

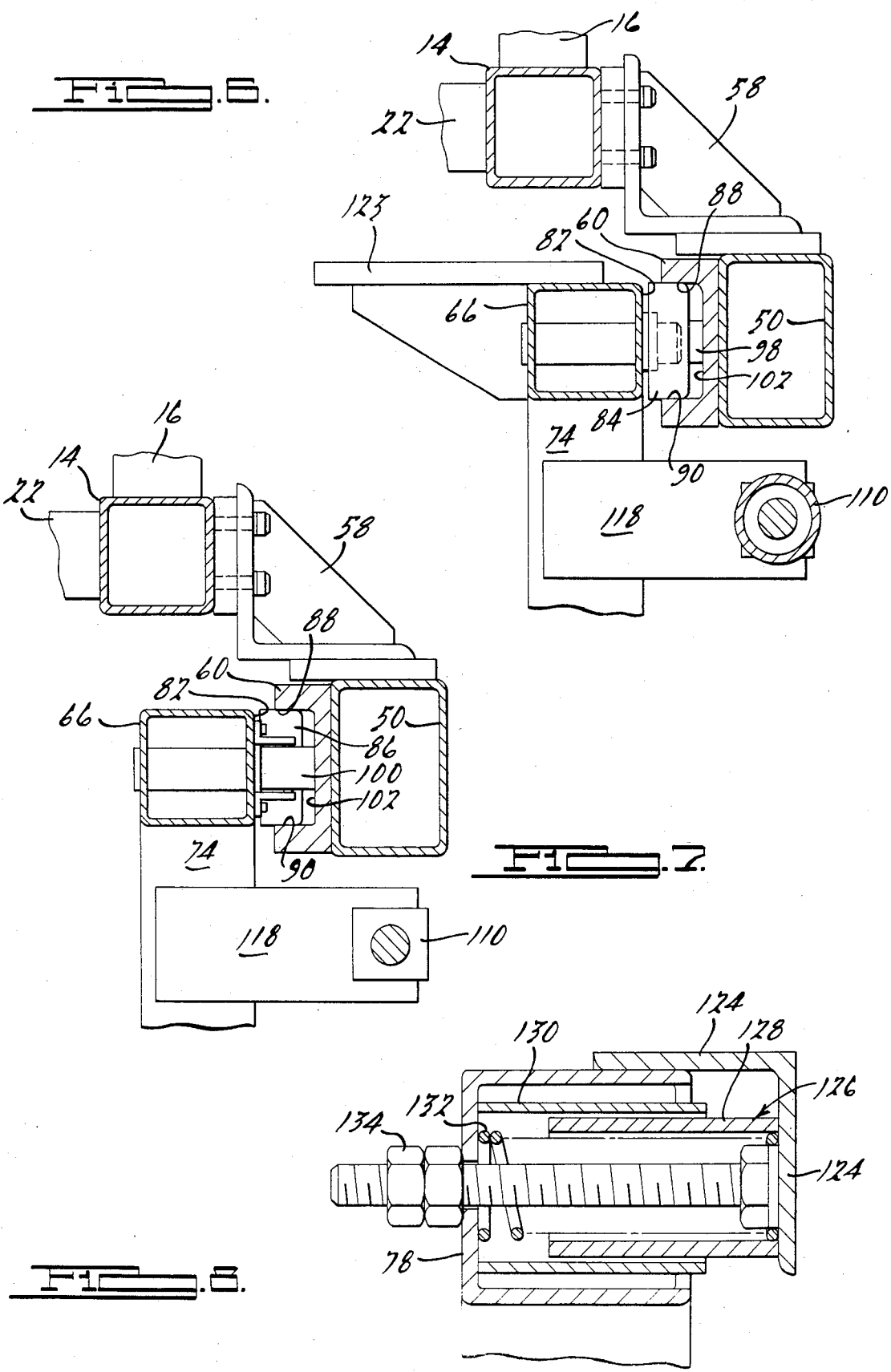

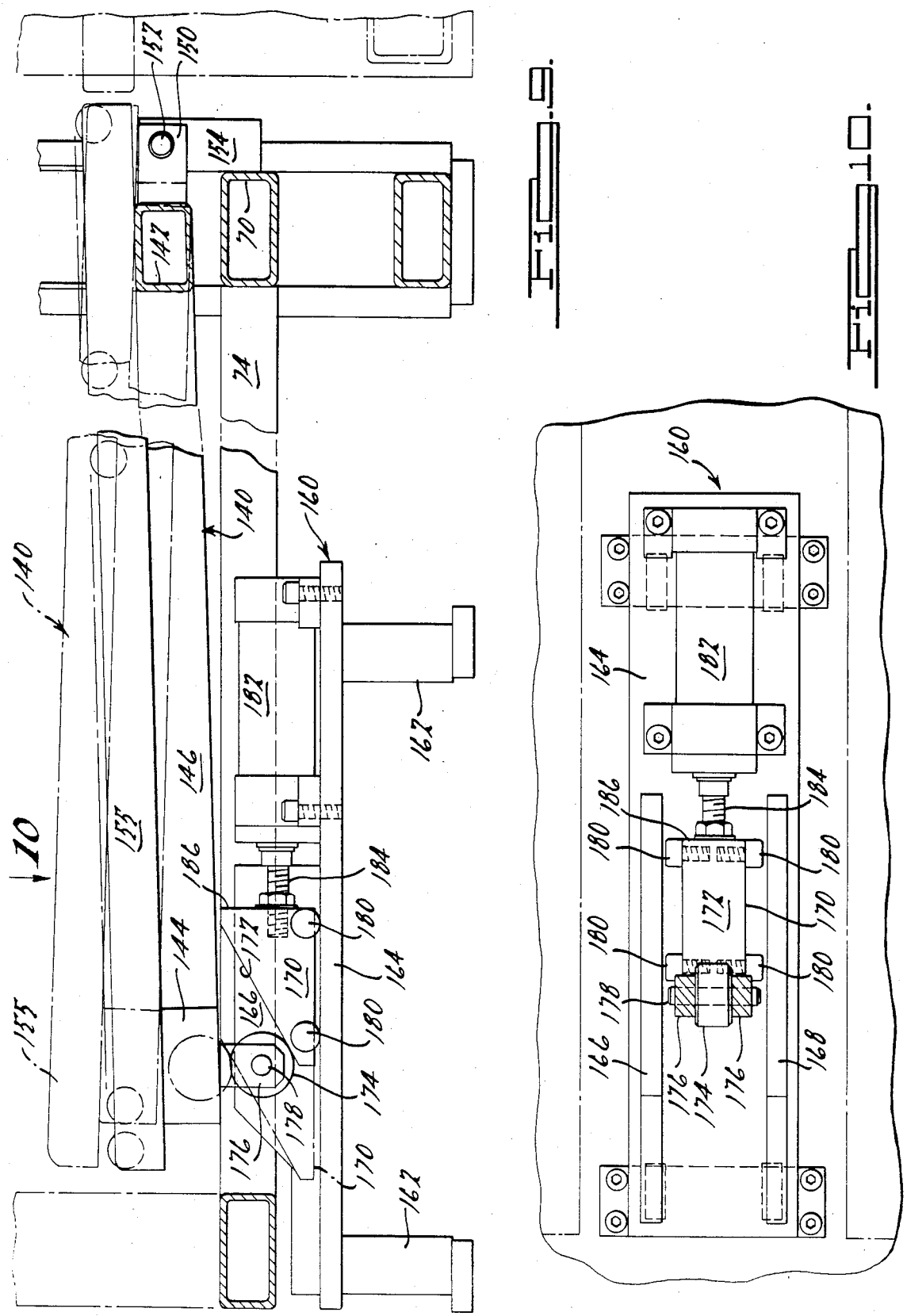

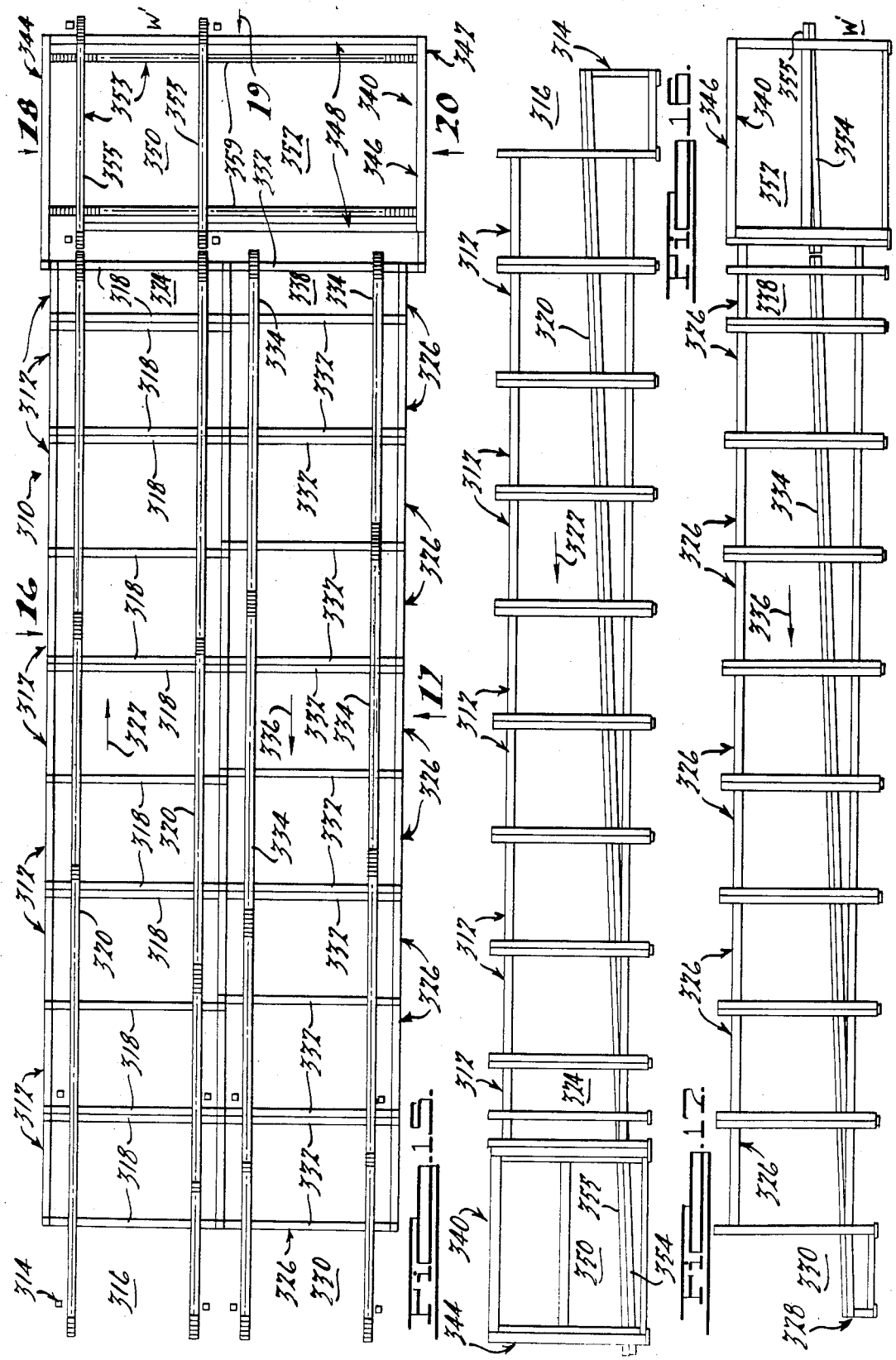

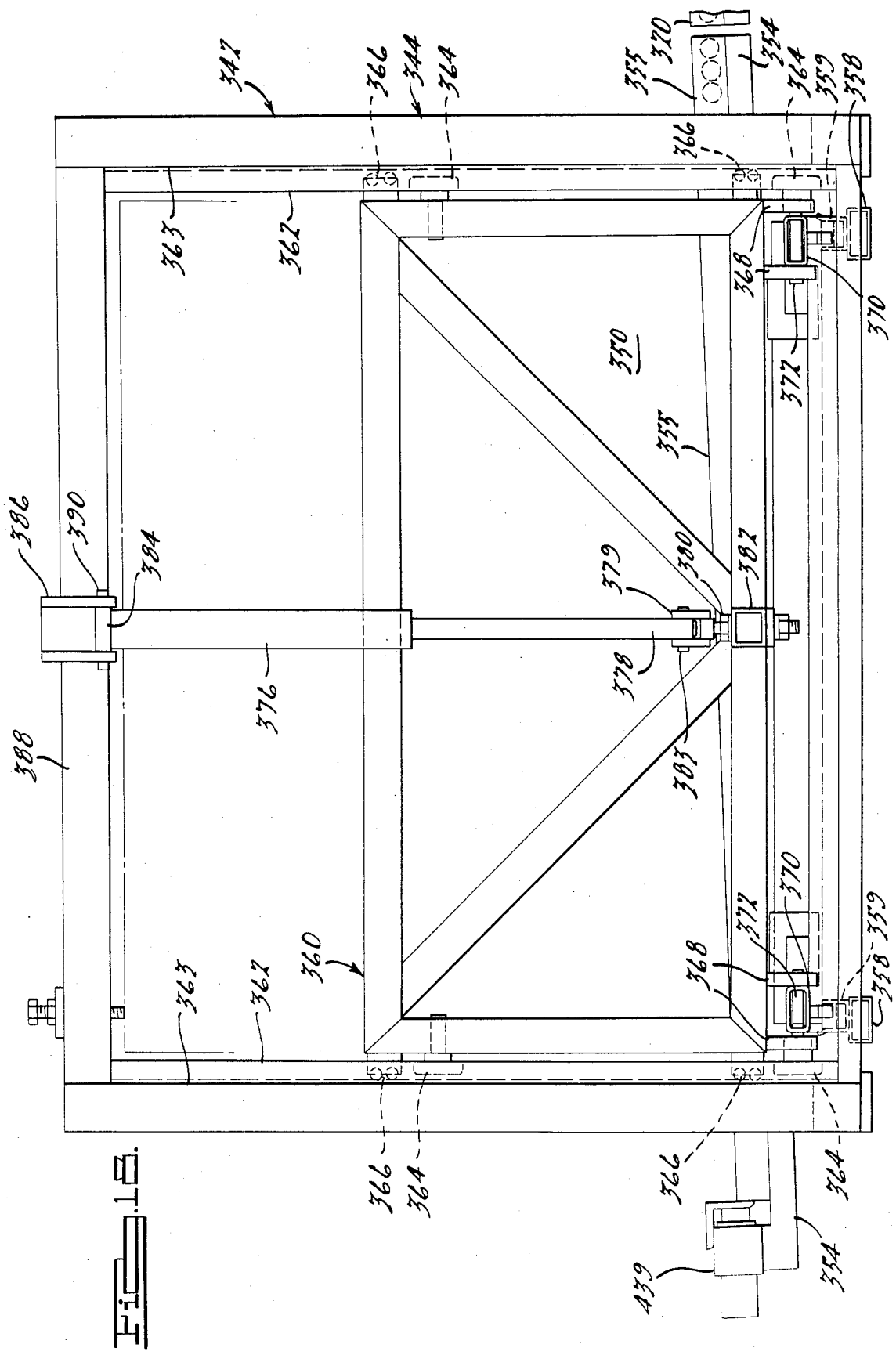

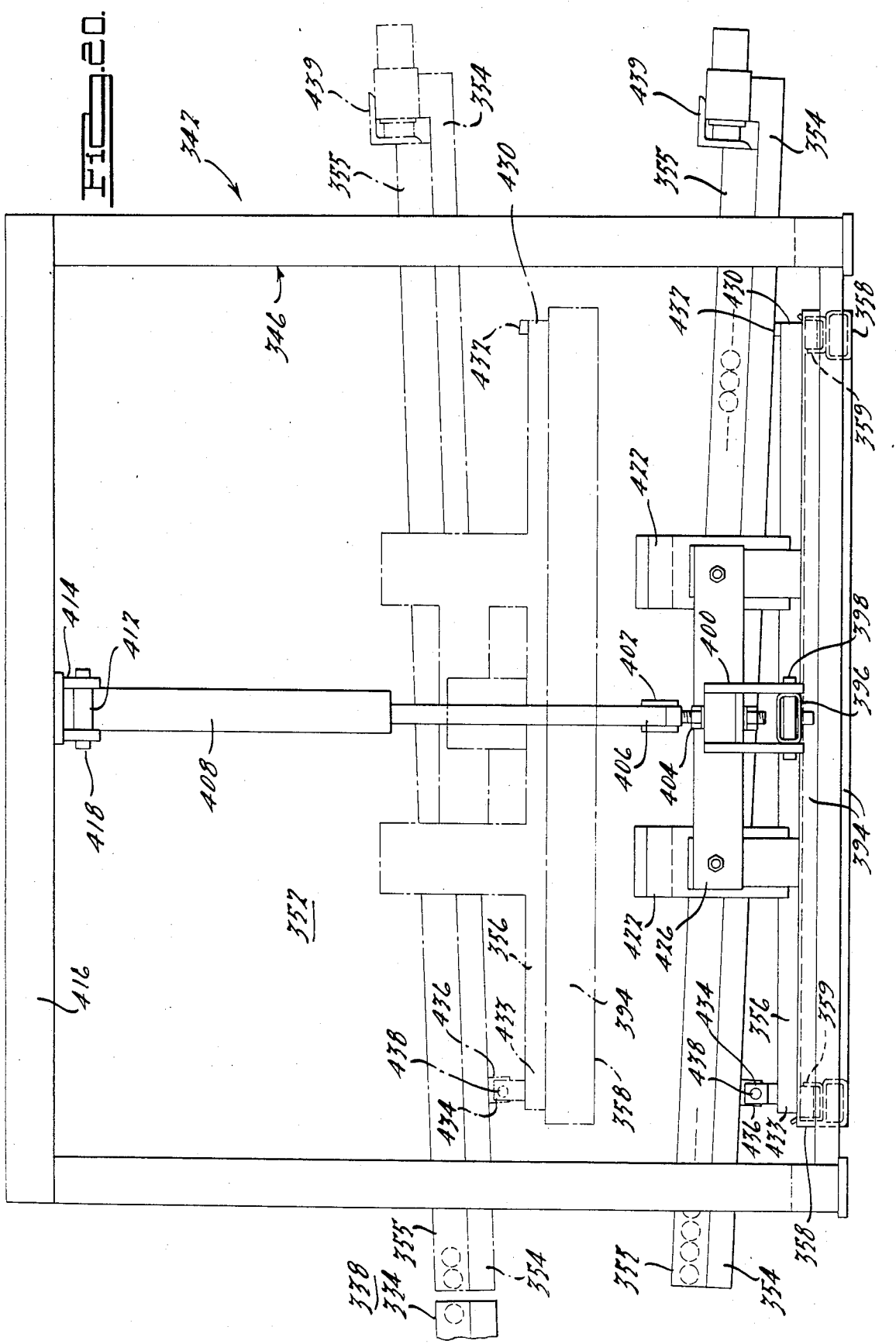

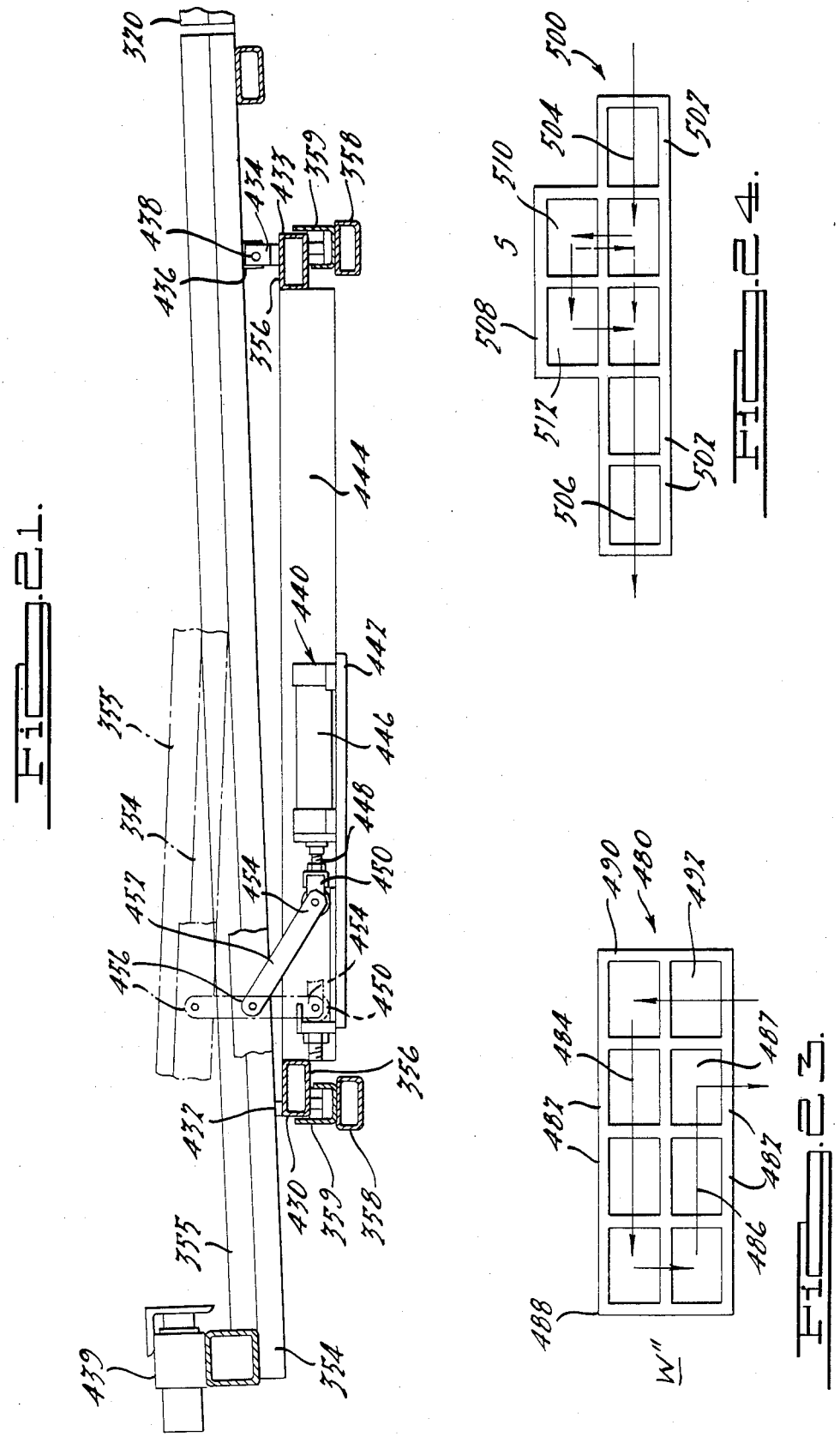

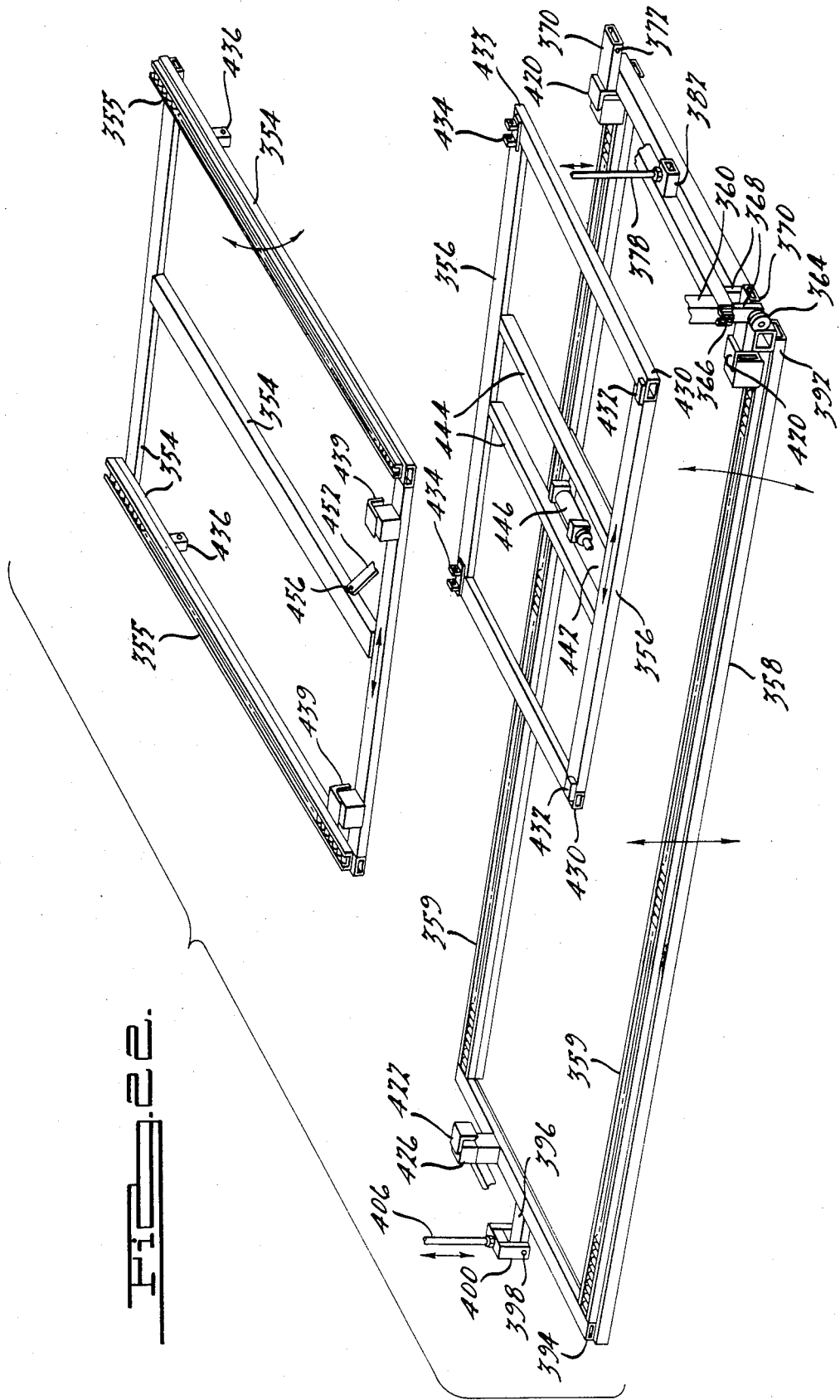

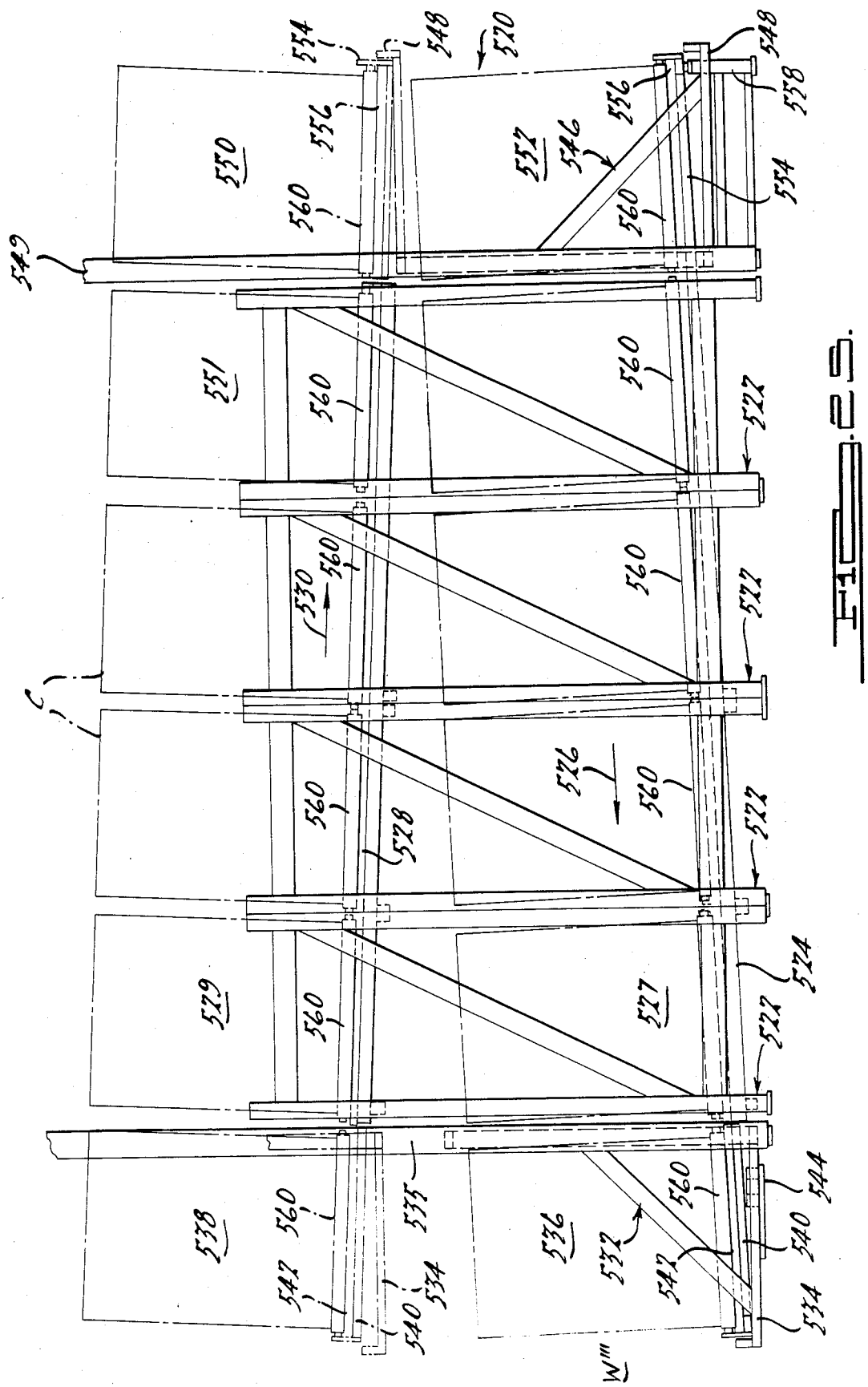

MATERIAL STORAGE AND DELIVERY SYSTEM

This is a division of application Ser. No. 620,165 filed June 13, 1984 now U.S. Pat. No. 4,595,330.

BACKGROUND AND SUMMARY OF THE INVENTION

The present invention relates to devices for controlling delivery of workpieces and/or workpiece containers of substantial size in manufacturing or assembly operations, and more particularly, to an improved material storage and delivery structure and system for storing, delivering, positioning and removing both full and empty workpiece containers to and from assembly or production line work stations as desired.

As is well known, assembly or production line facilities require the delivery to and temporary storage of large volumes of production parts at or near assembly or production line work stations to support worker line operations on a continuous mass production basis. Automotive production or assembly line operations in particular require the delivery of large numbers of parts of substantial size for assembly to automotive or truck vehicles, or subsystems thereof, on a continuous basis. Examples of such parts include engines and engine components, body panel parts, air conditioning assemblies, fuel tanks, and brake assemblies, which are typically stored, moved and delivered to line work stations in structural racks, containers or pallets of substantial volume and mass.

Due to the fact that mass production operations require the continuous delivery of a large number of such parts during any particular workshift, typical assembly line operations require movement, positioning and temporary storage of large number of such pallets or containers at the production facility. Substantial floor space is thus often needed for movement and continuous repositioning of both full and empty pallets or containers to facilitate delivery of full pallets to the production line, and removal of empty pallets or parts containers when the production parts contained in such containers have been fully depleted. It is typically necessary to utilize hi-lo or forklift vehicles on a continuous basis to deliver fresh pallets or containers to the assembly line and remove empty containers therefrom throughout a particular working shift to achieve the above-noted objectives.

It is, therefore, desirable to provide a production parts container storage and delivery system which facilitates the delivery of fresh pallets or containers of parts to production line work station as needed without the necessity of continuous forklift vehicle involvement. It is also desirable to provide such a system which enables empty pallets or containers to be similarly removed from assembly line work stations without continuous supplemental vehicle assistance. It is further desirable to provide such a system which stores and positions full and empty production parts containers as desired, and which facilitates the storage, delivery, positioning and removal of a sufficient number of such containers to obviate the need for supplemental vehicle intervention over an entire workshift. It is also desirable to provide such a system which enables production workers to index individual fresh parts containers to a work station as needed, and which allows for unobstructed and full access to the containers without any hindrance posed by the structure of the delivery system. It is moreover desirable to provide such a system which is of relatively low cost and of a reliable design, and which enables horizontal container movement without the need for complex mechanical transfer systems, so that expenses associated with the system controls and maintenance can be reduced. It is furthermore desirable to provide such a system which is adapted to facilitate handling and movement of containers, racks or pallets of diverse types without the need to modify the container movement system.

The present invention is intended to satisfy the above desirable features through the provision of a new and improved container storage and delivery structure and system which is designed in structural modules operative to define a first container storage rack for accumulating and storing pallets or containers of parts as required for a particular workshift. The module structure also defines a second storage rack for storing empty or depleted pallets or containers which accumulate during a particular workshift. The system also defines a full container loading station and an empty container unloading station which can be accessed by a forklift or hi-lo vehicle to deliver full pallets or containers and remove empty containers at the beginning or end of a particular workshift, or otherwise as desired.

The system also includes container indexing and transfer mechanisms for delivering individual containers from the first storage rack to an assembly line work station and positioning them as desired. The transfer mechanism further enables empty containers to be indexed from the work station for delivery to the second storage rack as necessary. The first storage rack is designed to enable positive and controlled gravity flow and accumulation of full pallets or containers from the container loading station toward the transfer mechanism. The second storage rack is similarly designed to provide for such gravity flow of empty containers from the transfer mechanism toward and to the container unloading station. The transfer mechanism, itself, is also provided with means for facilitating the indexing of containers onto and from the transfer mechanism by gravity flow on an individual basis.

In one embodiment of the invention, the first and second storage racks are situated in an over-under configuration, with the first storage rack located above the second storage rack so that full containers are accumulated and stored above empty containers. Moreover, both the loading and unloading stations are disposed at one end of the structure, with the loading station situated above the unloading station. This embodiment of the invention thus conserves maximum floor space and requires minimum forklift vehicle movement for effecting loading and unloading of containers. The transfer mechanism for delivering full containers to the work station and removal of empty containers therefrom is disposed at the opposite end of the structure from the loading and unloading stations.

Other embodiments of the invention include a side-by-side configuration in which the storage racks are disposed laterally of one another. A lateral transfer mechanism indexes and shuttles full containers or pallets from the first rack to the work station, and indexes empty containers or pallets from the work station to the second storage rack. This embodiment of the invention is specifically suited for applications where overhead space in a production facility is restricted or limited. Yet another embodiment of the invention is designed in a closed loop style configuration, and is specifically suited for applications where aisle space is restricted. Further embodiments of the invention includes an under-over version, which stores and accumulates full containers along a lower pathway and which stores and accumulates empty containers along an upper pathway, and a side shuttle version, which defines an elongated container flow path extending past a laterally disposed work station and which includes a transverse container transfer system which shuttles containers of parts to a work station for processing and returns containers of processed parts from the work station to the flow path for further movement and/or storage therealong. Each embodiment of the invention is specifically suited for a robotic interface through the use of close tolerance container positioning mechanism and which enables parts to be obtained and handled from the container with robotic machines. Each embodiment is also suited for use with priority sensors for controlling automatic guided vehicles for loading and unloading containers as required.

The above and other features of the invention will become apparent from a reading of the detailed description of the preferred embodiments, which make reference to the following set of drawings.

BRIEF DESCRIPTION OF THE DRAWINGS

FIG. 3 is an end view taken generally in the direction of Arrow 3 of FIG. 1;

FIG. 4 is an enlarged overhead view of the portion of the embodiment identified by Arrow 4 in FIG. 2;

FIG. 5 is a side elevational view, with portions broken away and partially in phantom, taken in the direction of Arrow 5 of FIG. 3;

FIG. 6 is a sectional view taken generally in the direction of Line 6—6 of FIG. 3;

FIG. 7 is a sectional view taken generally in the direction of Line 7—7 of FIG. 3;

FIG. 8 is a sectional view taken generally in the direction of Line 8—8 of FIG. 3;

FIG. 9 is a side elevational view of a portion of the embodiment of the invention shown in FIG. 1;

FIG. 10 is an overhead view taken generally in the direction of Arrow 10 of FIG. 9;

FIG. 15 is a schematic overhead view of another embodiment of the present invention;

FIG. 16 is a side view taken in the direction of Arrow 16 in FIG. 15;

FIG. 17 is a side view taken in the direction of Arrow 17 in FIG. 15;

FIG. 18 is a side elevational view of a portion of the embodiment of the invention shown in FIG. 15, taken generally in the direction of Arrow 18 in FIG. 15;

FIG. 20 is a side elevational view, partially in phantom, of a portion of the embodiment of the invention shown in FIG. 15, taken generally in the direction of Arrow 20 in FIG. 15;

FIG. 21 is a side elevational view, partially in section and partially in phantom, of a portion of the embodiment of the invention shown in FIG. 15;

FIG. 22 is an exploded perspective view of a portion of the embodiment of the invention shown in FIG. 15;

FIG. 23 is a schematic view of another embodiment of the invention;

FIG. 24 is a schematic view of a further embodiment of the present invention; and FIG. 25 is a side elevational view, partially in phantom, of yet another embodiment of the present invention.

DETAILED DESCRIPTION OF THE PREFERRED EMBODIMENTS

Figure 1:
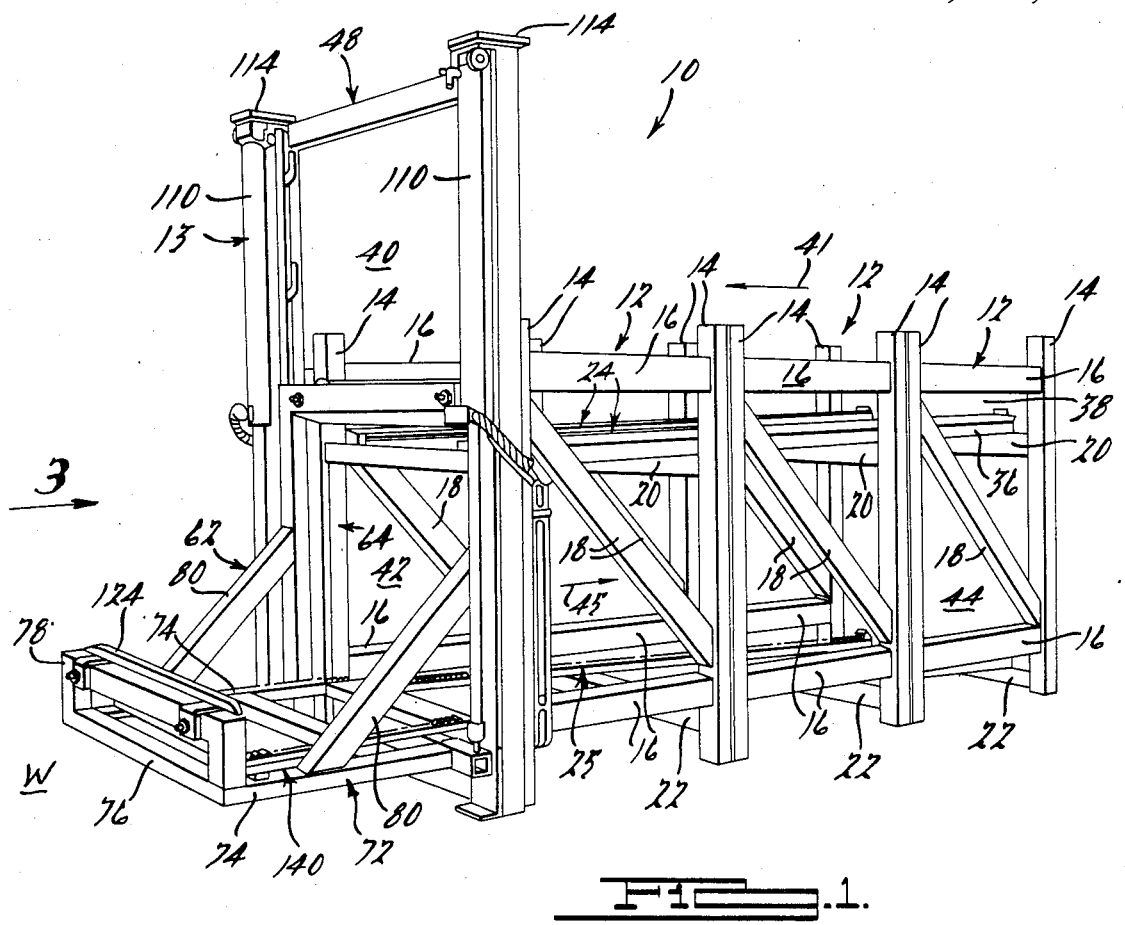
FIG. 1 is a perspective view of a container storage and delivery system in accordance with one embodiment of the present invention.
Figure 2:
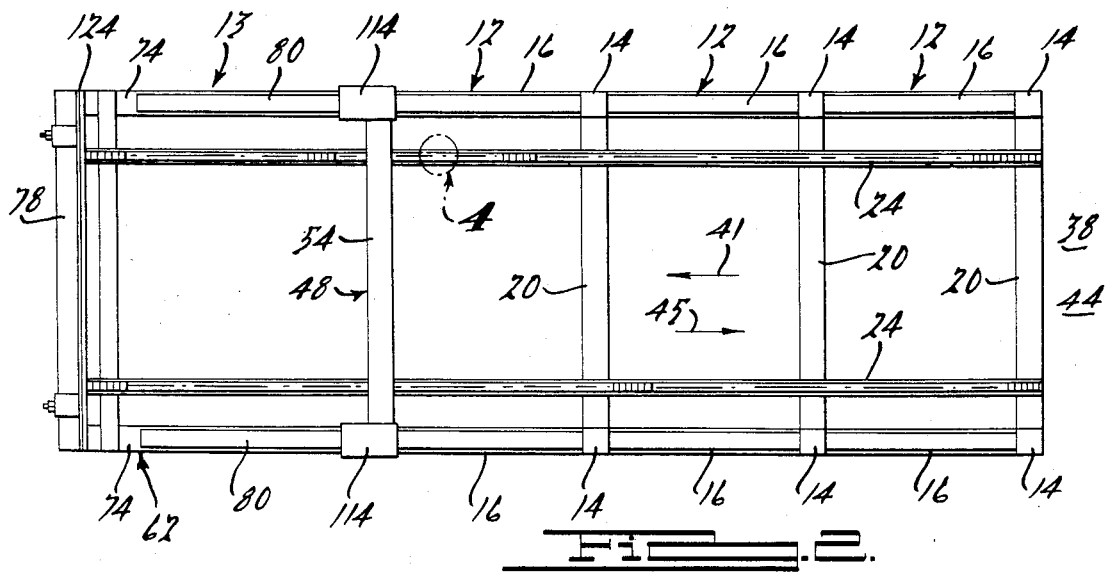
FIG. 2 is a top or overhead view of the embodiment of the invention shown in FIG. 1.

Referring now more specifically to the drawings, a container storage and delivery structure and system in accordance with one embodiment of the present invention is indicated generally in FIG. 1 by reference numeral 10. The system 10 is comprised of separate and distinct structural modules 12 assembled in a series relationship, and a container indexing and transfer system 13, whose purpose and function will be described more fully hereinafter. Each of the structural modules 12 is comprised of four spaced parallel vertical square tubing members 14, four parallel side square tubing members 16 extending horizontally between respective vertical members 14, and two diagonally extending square tubing members 18. As shown in FIGS. 1 and 2, each module 12 also includes a pair of transverse horizontal upper rail supports 20 which extend between respective vertical members 14, and a similar pair of transverse horizontal lower rail supports 22. The upper and lower rail supports 20 and 22 of each module 12 are displaced vertically relative to the rail supports 20 and 22 of adjacent structural modules 12 to cooperatively define structural pathways for supporting upper and lower spaced pairs of flow rails 24 and 25 at angles relative to horizontal in the manner shown in FIG. 1.

Each of the flow rails 24 and 25 is of the type disclosed in application Ser. No. 575,679, entitled "Improved Material Flow Rail", filed Feb. 1, 1984. Each of the flow rails 24 and 25, as well as other flow rails described hereinafter, is identical in design and operation, so that only one flow rail 24 will be described in detail. As shown in FIG. 4, flow rail 24 comprises a plurality of small diameter, close-center, high capacity rollers 28 supported for rotation on loose fitting bearings 30 upon shafts 32 extending through a low profile support channel 34. Each flow rail 24 is comprised of three rows of such rollers 28 set in a staggered pattern. With this design, the load capacity of each flow rail 24 exceeds 1,000 pounds per lineal inch, so that the flow rail 24 is particularly suited for use in facilitating the support and transfer of heavy pallets or parts containers. The flow rails 24 and 25 are secured upon rail supports 20 and 22 by welding, or other similar fastening methods, and can be reinforced by a structural tubing member 36 extending along and welded to the underside of each flow rail channel 34 in applications involving the transfer of relatively heavy loads.

In the preferred embodiment of the invention, the vertical displacement of respective adjacent rail supports 20 and 22 is such that each flow rail 24 and 25 is structurally supported with a minimum slope of ¼ inch per lineal foot in the longitudinal direction of the flow rails 24 and 25. In this manner, the modules 12 and upper flow rails 24 cooperatively define a full container loading station 38 at one upper end of the structure 10, a full container indexing station 40 at the opposite upper end of the structure 10, and a gravity flow container pathway 41 extending downwardly from loading station 38 to indexing station 40. On the other hand, the modules 12 and lower flow rails 25 cooperatively define an empty container indexing station 42 at one lower end of the structure 10, an empty container unloading station 44 at the opposite lower end of the structure 10 disposed immediately below loading station 38, and a gravity flow container pathway 45 extending downwardly from indexing station 42 to unloading station 44.

The container indexing and transfer system 13 is operative to index and transfer full containers or pallets from indexing station 40 to an assembly line work station W, as well as from the work station W to indexing station 42 for gravity flow transfer along pathway 45 to the unloading station 44. As shown more particularly in FIGS. 3 through 8, the indexing and transfer system 13 includes a rectangular vertical structural frame 48 defined by a pair of spaced parallel vertical columns 50 and 52, and a pair of upper and lower parallel cross braces 54 and 56 extending between columns 50 and 52. The frame 48 is of sufficient dimension to encompass both of stations 40 and 42, and is assembled and/or secured to the module structure 12 adjacent indexing stations 40 and 42 by way of a reinforced angle iron or channel members 58, one of which is shown in FIG. 6, to effect a rigid and secure assembly of the frame 48 with the module 12. The frame 48 includes a pair of vertical track members 60 and 61 welded to columns 50 and 52, whose purpose and function is to stabilize and guide a cantilevered platform assembly 62 as it is moved between stations 40 and 42 as described more fully hereinafter.

The cantilevered platform assembly 62 is comprised of a rectangular vertical frame 64 defined by a pair of spaced vertical frame members 66 and 68 and spaced parallel horizontal crossmembers 70. The platform assembly 62 also includes a horizontal rectangular frame 72 extending normally of vertical frame 64, and which is defined by a pair of spaced parallel frame members 74 which are welded at one end to the vertical frame 64, and a cross brace 76 extending between the exposed ends of frame members 74. The horizontal frame 72 is also formed with a U-shaped transversely extending container retaining bar 78 which depends upwardly from and is generally coplanar with the cross brace 76. Diagonally extending parallel support members 80 extend between the vertical frame 64 and the horizontal frame 72 to yield a rigid cantilevered construction of the platform assembly 62.

The platform assembly 62 is specifically designed and adapted to be reciprocated vertically between indexing stations 40 and 42 through the provision of the following design features. As shown in FIGS. 3 and 5, frame member 66 of vertical frame 64 defines an outboard vertical face 82 opposed to and facing the track member 60 on vertical frame 48. Mounted at spaced vertical locations along frame member 66 and extending normally of face 82 are a pair of roller assemblies 84 and 86, each of which is dimensioned so that its outer peripheral surface is operative to abut and engage the spaced vertically extending inner sidewalls 88 and 90 of track 60 as shown in FIG. 6. On the opposite side of vertical frame 64, similar roller assemblies 92 and 94 are mounted at vertically spaced locations along the outboard face 96 of frame member 68. The roller assemblies 92 and 94 are similarly dimensioned to coact with the spaced vertical sidewalls of track 61, and cooperate with roller assemblies 84 and 86 to stabilize and retain the frame member 64 within the volume of vertical frame 48 as the platform assembly 62 is moved between stations 40 and 42.

Frame 64 is further provided with a set of vertically spaced double roller assemblies 98 and 100 which extend normally from the outboard face 82 of frame member 66 and which are operative to engage and roll along the bottom surface 102 of track 60, as shown in FIGS. 6 and 7. The outboard face 96 of frame member 68 is similarly provided with a vertically spaced pair of double rollers 104 and 106, which similarly engage and roll along the bottom surface of track 61. The spaced double roller assemblies 98, 100, 104 and 106 are designed and located to cooperate with the bottom surfaces of tracks 60 and 61 to inhibit any skewing or rotation of the platform assembly 62 about an axis extending normally of frame 48 during reciprocal movement of the platform assembly 62 between indexing stations 40 and 42.

To achieve reciprocal movement of the platform assembly 62 between indexing stations 40 and 42, the transfer assembly 13 is provided with a pair of hydraulic cylinders 110 which are secured at their respective top ends by pin connections 112 to fixtures 114 welded to the top ends of columns 50 and 52 of frame 48. The opposite ends of each of the hydraulic cylinders 110 are secured by way of adjustable bolt assemblies 116 to horizontal legs 118 depending outwardly from the horizontal frame members 74 of platform assembly 62, which enables the hydraulic cylinders 110 to be driven by a hydraulic system (not shown) to effect reciprocal movement of the platform assembly 62 between stations 40 and 42.

To facilitate container indexing and movement, the platform assembly 62 is further provided with an elongated impact plate 120 which is secured to a pair of laterally spaced shock absorber assemblies 122 adjustably mounted upon the upper horizontal cross member 70 of vertical frame 64, and positive stop plates 123 mounted to and extending from frame members 66 and 68. A similar impact plate 124 is mounted upon a pair of transversely spaced shock absorber assemblies 126 which are adjustably mounted to the retaining bar 78 of horizontal frame 72. Each impact plate 102 and 124, and their associated shock absorber assemblies 122 and 126, are operative to provide a load absorbing feature during operation of the platform assembly 62, and stop plates 123 are operative to assist in positioning containers at station 40, as described more fully hereinafter. Since shock absorbers 122 and 126 are similarly designed, only shock absorbers 126 will be described below.

As shown most readily in FIG. 8, each of the shock absorber assemblies 126 includes a cylindrical collar portion 128 which is mounted to impact plate 124 and which extends normally thereto. The collar 128 is received within a complementary shaped sleeve 130 disposed within and extending transversely of retaining bar 78. A coil spring 132 is received within and extends through both collar 128 and sleeve 130, with its opposite ends abutting both impact plate 124 and a sidewall of retaining bar 78 as shown in FIG. 8. A load adjusting bolt assembly 134 is secured at one end to the impact plate 124 and extends through retaining bar 78 for adjusting the biasing force generated by the spring 132.

To facilitate the indexing of containers to and from the platform assembly 62, the assembly 62 is provided with a pivot platform 140 shown most readily in FIGS. 3 and 5, and which is particularly adapted for pivotal movement between distinct inclined positions for facilitating receipt of containers from station 40 on the upper container pathway 41, as well as discharge of containers through station 42 onto the lower container pathway 45. The pivot platform 140 is formed from a pair of transversely extending cross members 142 and 144, and a pair of support rails 146 which extend normally between cross members 142 and 144. As shown most readily in FIG. 5, the cross member 144 of the platform 140 is adapted to normally rest upon horizontal frame 72 so that the frame 72 can provide normal load support to the pivot platform 140 and a container disposed thereon. Pivot platform 140 also includes a forked tongue 150 shown in FIG. 9 which depends from cross member 142 and which is pivotally connected by way of a pivot pin 152 to an upwardly depending flange 154 secured to cross member 70 of vertical frame 64. Extending along and supported by each of the support rails 146 are parallel flow rails 155 of a design identical to flow rails 24 and 25 from facilitating gravity flow of containers onto and from the platform 140. The dimensions of flange 154 and the location of the pivot pin 152 connecting flange 154 and tongue 150 are such that the normal position of pivot platform 140 and flow rails 155 are at an incline which matches the incline of the upper flow rails 24. This feature enables the platform assembly 62 to be moved by operation of cylinder 110 to a position adjacent indexing station 40 to place flow rails 155 in alignment with the flow rails 24 of the upper container pathway 41 to facilitate gravity flow movement of containers or pallets from station 40 onto the platform assembly 62.

To assist in indexing empty containers from platform assembly 62 through station 42 onto the lower container pathway 45, the transfer system 13 includes a tilt mechanism 160 as illustrated in FIG. 9 and 10. The tilt mechanism 160 comprises a base structure 162 defining a horizontal support plate 164 which supports a pair of spaced parallel upwardly depending sidewalls 166 and 168. The tilt mechanism 160 also includes a driving wedge 170 formed to define an inclined camming surface 172 operative to engage and drive a follower wheel 174 fixed for rotation upon a bifurcated flange 176 depending downwardly from cross member 144 of pivot platform 140 by way of a pivot pin 178. The driving wedge 170 is designed for longitudinal movement along support plate 164 between sidewalls 166 and 168 from the position shown in solid lines to the position shown in phantom in FIG. 9. For this purpose, driving wedge 170 is provided with outboard wheels 180 and is operative to be driven by a hydraulic cylinder 182 secured upon support plate 164 and which drives the wedge 170 through cylinder rod 184 secured to and operative to apply a longitudinal force to end face 186 of the wedge 170. As is readily apparent, the hydraulic cylinder 182 can thus drive the wedge 170 against follower wheel 174 so that the follower wheel 174 will cam up along surface 172 and drive the pivot platform 140 to the inclined position illustrated in phantom in FIG. 9. The overall dimensions of the tilt mechanism 160 are such that the inclined phantom position of pivot platform 140 will be disposed at an angle which matches the incline of the lower flow rails 25 to facilitate gravity flow movement of empty containers along the flow rails 155 from pivot platform 140 through indexing station 42 and onto the lower flow rails 25 to allow containers to be accumulated and stored along the lower pathway 45.

The overall design and construction of the system 10 facilitates efficient storing, positioning and indexing of containers to and from assembly line work station W in the following manner. At the beginning of a work shift, a forklift vehicle can be utilized to sequentially deliver full containers or pallets to loading station 38 for gravity flow along the upper flow rails 24 in the direction of the full container indexing station 40. In this regard, the first such full container will flow to the indexing station 40 and into engagement with impact plate 120 of the platform assembly 62 and the succeeding containers will accumulate in respective storage positions along pathway 41 behind the first container. In the event that the overall load placed upon the impact plate 120 by the containers exceeds the spring force of shock absorbers 122, the positive stop plates 123 will operate to provide an auxiliary retaining structure to inhibit movement of containers. After the system 10 has been loaded for a particular work shift, an operator can utilize the platform assembly 62 to index and deliver individual containers to the work station W by first moving assembly 62 to station 40. Until the assembly 62 reaches its fully upward position, impact plate 120 and stop plates 123 will preclude movement of containers beyond indexing station 40. However, the vertical location of stop plates 123 is such that the first container will clear plates 123 when the assembly 62 reaches station 40. Upon such arrival, the container located at station 40 will automatically flow by gravity onto pivot platform 140 due to the angular alignment of the flow rails 155 with upper flow rails 24. The container will continue to move by gravity flow onto pivot platform 140 until it engages impact plate 124 on retaining bar 78. The platform assembly 62 may thereafter be removed downwardly from station 40 along tracks 60 and 61 to a position adjacent work station W, where the operator can access the container to remove parts as desired for assembly line operations.

When the container has been depleted of parts, the operator can thereafter activate the hydraulic cylinder 182 of tilt mechanism 160 to move the pivot platform 140 into the phantom position shown in Figure 9, so that the flow rails 155 on the platform 140 will be angularly aligned with the flow rails 25 on lower container pathway 45. The empty container can then flow by gravity from the pivot platform 140 through indexing station 42 and onto the lower pathway 45. The tilt mechanism can then be deactivated to return platform 140 to its normal resting position on frame 72, and the entire platform assembly 62 can thereafter by cycled upwardly to indexing station 40 to effect delivery of the next full container to the work station W in the previously described manner. In this fashion, each of the full containers loaded and stored upon the upper container pathway 41 at the beginning of a work shift can be indexed and delivered to the assembly line work station W, and thereafter shuttled to the lower pathway 45 where they can be accumulated and stored. The empty containers can thereafter be removed from the system 10 in a sequential fashion through the unloading station 44 by a forklift driver at the end of the work shift.

The above-described design and construction of the structure and system 10 provides an improved container storage and delivery system having several advantages. In this regard, the structure 10 enables a forklift driver to load and store enough parts containers or pallets to last for a full working shift without intermittent intervention during the shift. The standard length of the structure 10 is roughly sixteen feet, with the platform assembly 62 being dimensioned to accommodate containers or pallet structures of up to 54 inches in heighth, 54 inches in length and 96 inches in width. Moreover, the flow rails 24 and 25 eliminate the need for mechanical transfers to effect horizontal movement of containers along pathways 41 and 45, and result in a system 10 having fewer moving parts and requiring less controls. The flow rails 24, 25 and 155 also yield reduced maintenance expenses as compared with prior known systems due to the fact that they utilize loose fitting bearings which do not require lubrication and which resist the accumulation of dirt and foreign objects. The cantilevered design of the platform assembly 62 allows for unobstructed access to the container from both sides, as well as from the top and front side of the container. Moreover, the overall cantilever design of the platform assembly 62, and particularly the provision of the rollers 84, 85, 92, 94, 98, 100, 104 and 106 within vertical tracks 60 and 61 of the vertical frame 48 allows the platform assembly 62 to be moved up and down to index and deliver fairly heavy container loads without any tipping or skewing of the assembly 62. In this regard, the system 10 is specifically suited for line operations involving the storage and delivery of containers of fairly heavy parts such as engines, transmissions, floor pan panels, fuel tanks, air conditioning assemblies, body panels, and miscellaneous engine parts such as cylinder heads, crankshafts, camshafts, oil pumps, intake manifolds, pistons and connecting rods. While the preferred design of this embodiment of the invention utilizes hydraulic cylinders 110 to effect movement of the platform assembly 62, such movement could also be effected by way of a pneumatic system or by way of electrical motors.

It should be noted that the design of the system 10 is specifically adapted for use with additional optional features. In this regard, while the basic design of the system 10 is intended to effect gravity flow horizontal movement of containers or pallets, the system 10 can also be equipped with power assist mechanisms, which grab or push individual pallets in a well-known manner to assist the movement of containers or pallets along the flow rails 24 and 25. Moreover, while the standard length of the system 10 is roughly sixteen feet, the principles of the system 10 have been applied to designs possessing much greater container storage capacity, and extending to up to 60 feet in length. In such applications, it may be necessary to provide intermediate stop mechanisms to hold particular pallets in intermediate positions along the length of either the upper pathway 41 or the lower pathway 45. In addition, with a system 10 of fairly substantial length, it may be necessary to provide auxiliary braking mechanisms so that particular individual pallets do not gather excessive speed due to gravity flow over long pathway distances. In this connection, the flow rails 24 and 25 along pathways 41 and 45 can be provided with an optional air braking system of the type disclosed in the previously noted application Ser. No. 575,679, entitled "Improved Material Flow Rail", filed Feb. 1, 1984. Such an air braking system includes an air bladder-hose retained within the support channels 34 of the rails 24 and 25 and covered with a urethane friction material. The bladder hose can be inflated so that the friction covering contacts the bottom edges of the rollers 28 within a specified length along rails 24 and 25 to prevent them from turning, and creating a breaking effect to slow the rate of flow of a particular pallet or parts container along pathways 41 and 45. Specific positioning of a pallet or container along such pathways can also be accomplished with the above-described braking system by using a limit switch activated air valve in conjunction with the bladder hose. The braking system can also be equipped with a variable rate timer that can be utilized to control and vary the pulsing of air through the bladder hose at specific flow rates to control the speed of gravity flow of containers along pathways 41 and 45. Such a variable timer can be utilized to increase gravity flow rates along pathways 41 and 45 by shortening the time period of each pulse of air through the hose and/or increasing the period of time between succeeding pulses. Alternatively, the timer enables an operator to decrease gravity flow rates by lengthening the time period of each air pulse and/or shortening the time period between pulses.

The design of the system 10 is also particularly suited for it to be serviced by automatic guided vehicles. In this regard, the design of the system 10 allows photocell or similar type priority sensors to be outfitted along the upper container pathway 41 to detect when the delivery of additional pallets or containers may be required. Such sensors can be wired into an automatic guided vehicle control system to automatically dispatch a robotic automatically guided vehicle to deliver and deposit a fresh full container of parts at the loading station 38, and/or to remove an empty container from the unloading station 44. Similar sensors can be applied to the platform assembly 62 for signaling when an empty container is indexed from pivot platform 140 onto the lower pathway 45 to effect automatic movement of the platform assembly 62 to its upward position adjacent indexing station 40 for receipt of the next full pallet or container for delivery to work station W. The design of the system 10 also enables it to interface well with robotic mechanisms operative to automatically handle and process parts at work station W. In this regard, in such robotic applications, the system 10 can be provided with auxiliary container positioning devices such as longitudinal and/or lateral stop plates and positioning cylinders for locating and accurately positioning containers on platform assembly 62 to within close tolerances so that parts or workpieces can be properly accessed therefrom and handled by the robotic mechanism.

While the above description has related to the delivery of parts to an assembly line work station, it should be noted that the design of the system 10 also enables it to be utilized for loading finished parts from a production line into empty containers and delivering empty containers to the line for loading. Moreover, the design of the system 10 enables it to process and deliver pallets or containers of different dimensions, as well as containers which have been bent or damaged through abuse or normal wear and tear, by placing such containers upon uniform slave pallets dimensioned for acceptance with the system dimensions. In such applications, the system 10 can be provided with an optional lifting assembly similar to that of platform assembly 62 to move empty slave pallets from the unloading station 44 up to loading station 38.

Figure 11:
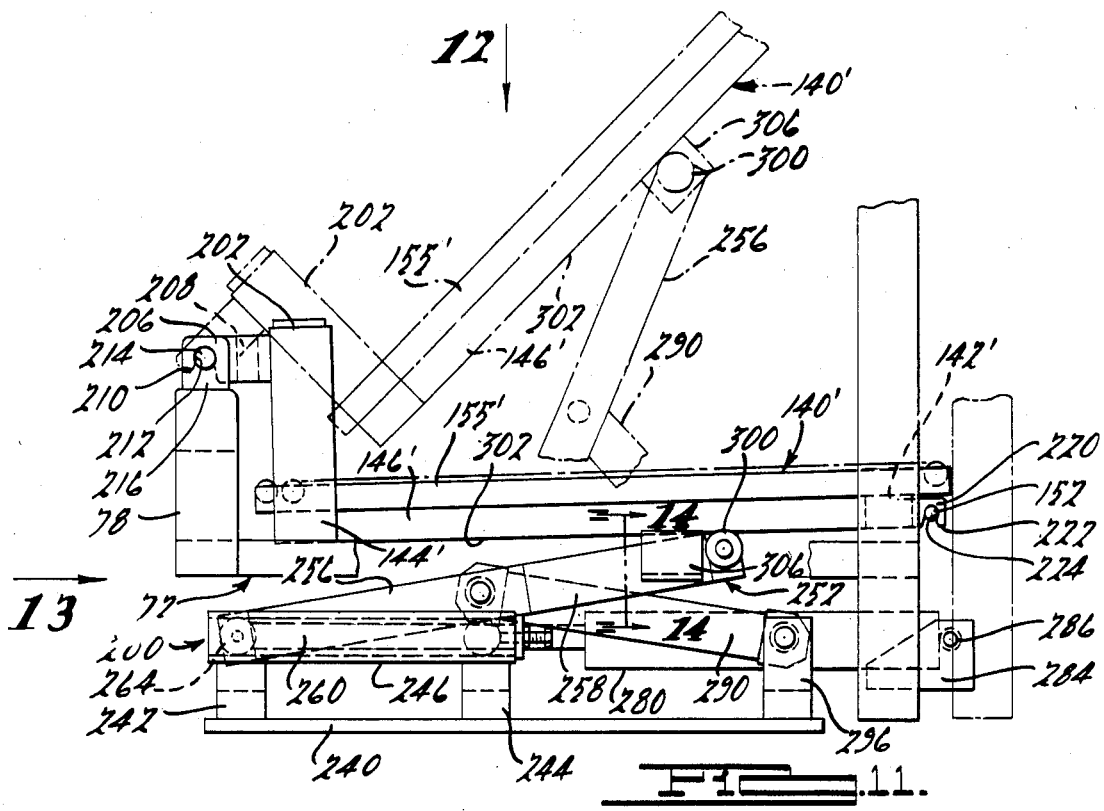
FIG. 11 is a side elevational view, partially in phantom, of a portion of the embodiment of the invention shown in FIG. 1.
Figure 13:
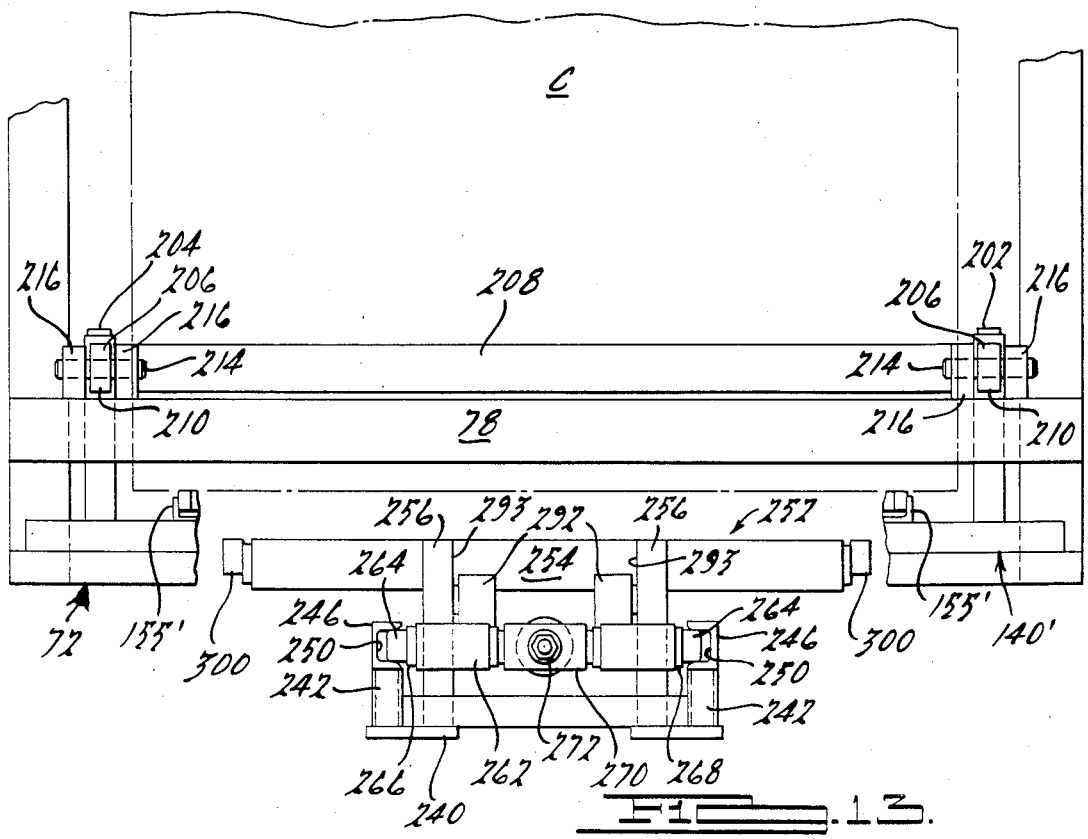
FIG. 13 is a side elevational view, with portions broken away, taken in the direction of Arrow 13 of FIG. 11.
Figure 12:
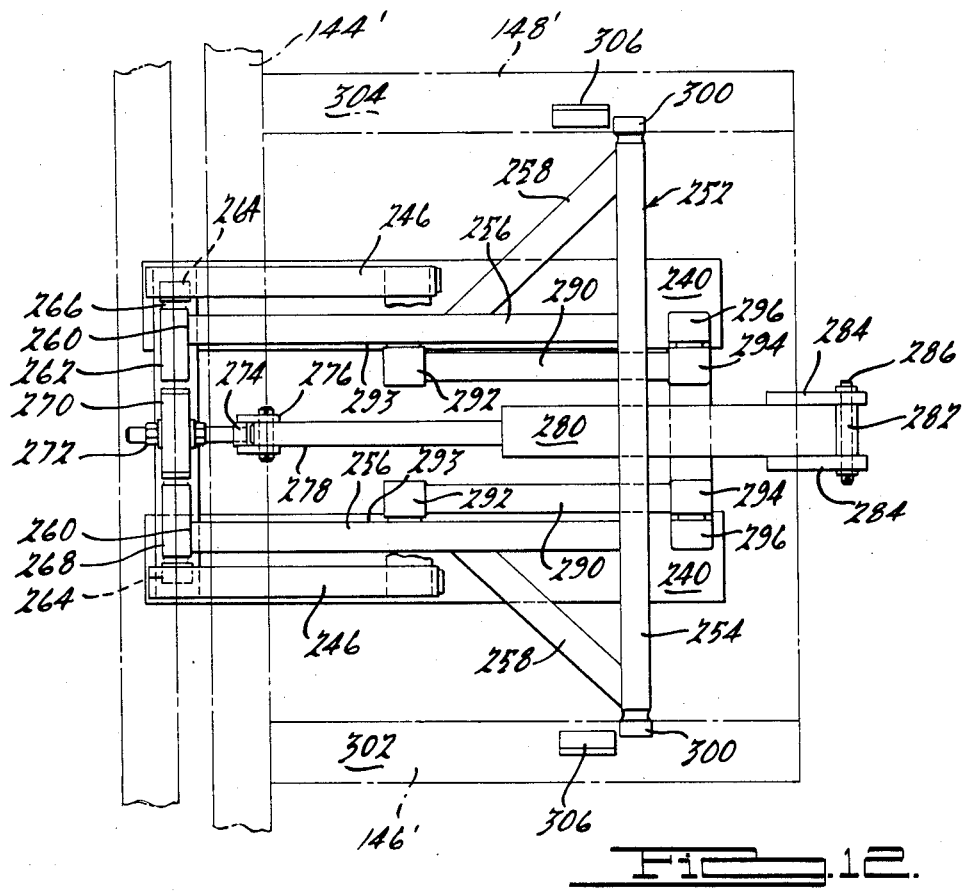
FIG. 12 is a partial top elevational view, partially in phantom, taken generally in the direction of Arrow 12 of FIG. 11.
Figure 14:
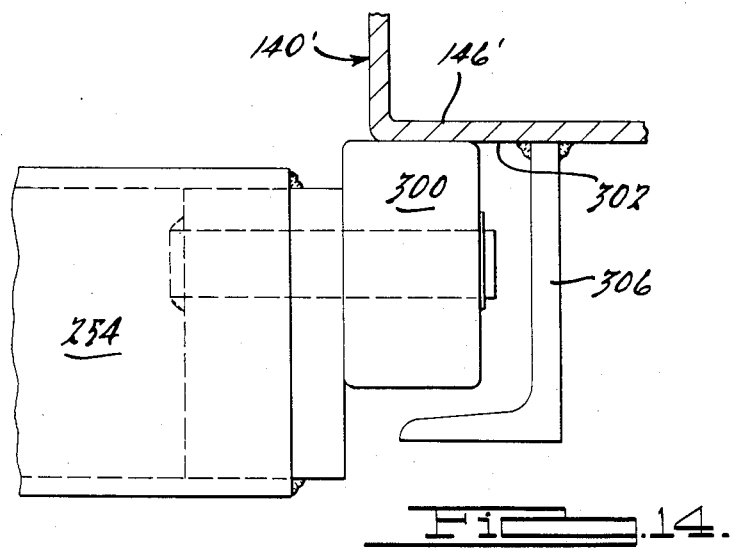
FIG. 14 is a partial sectional view taken generally in the direction of Line 14—14 of FIG. 11.

In addition to the above, the system 10 can also be utilized with an optional hydraulic tipping mechanism 200 such as shown in FIGS. 11 through 14. The tipping mechanism 200 enables containers or pallets to be tilted upward through up to 45° to facilitate operator access to parts within the container, and is specifically advantageous for use with pallets or containers having fairly deep dimensions. This embodiment of the invention utilizes a modified pivot platform 140' formed from spaced parallel cross members 142' and 144', and support rails 146' and 148' welded to and extending normally between cross members 142' and 144' as shown in FIGS. 11 and 12. The pivot platform 140' supports a pair of flow rails 155', and is provided at one end with spaced parallel upwardly depending posts 202 and 204, each of which is formed with a tongue portion 206 extending normally from its upper end. A stabilizing bar 208 extends normally between the tongue portions 206 of each of the posts 202 and 204 to provide rigidity to each tongue portion 206, and to assist in retaining a pallet or container C upon the pivot platform 140' during a tipping operation. The tongue portions 206 are also formed to define overhanging lips 210, and laterally extending recesses 212 operative to receive pivot pins 214 mounted between upwardly depending spaced parallel flanges 216 welded to the retaining bar 78 of the horizontal frame 72 of the platform assembly 62. The opposite end of pivot platform 140' is provided with a pair of spaced parallel tongues 220 which terminate in lip portions 222 defining recesses 224 operative to receive pivot pins 152. As is readily apparent, the configuration of each of tongue portions 206 and 220 allows the platform 140' to be pivoted about two independent axes to effect several desired manipulations of containers. More particularly, the pivot platform 140' can be pivoted by using the previously described tilting mechanism 160 about the axis defined by pivot pins 152 for tilting platform 140' to index empty containers through station 42 onto the lower container pathway 45. On the other hand, the pivot platform 140' possesses the additional capability of pivoting about the axes of pivot pins 214 to effect tilting of the pivot platform 140' to facilitate operator access to parts within the container through the use of the tipping mechanism 200 as described hereinafter.

The tipping mechanism 200, itself, includes a base plate 240 which sits on the floor of the production facility and which supports a first set of upwardly extending legs 242, and a second set of legs 244. The two sets of legs 242 and 244 support two parallel channels 246, each of which defines an elongated guide track 250 for receiving and defining a restricted path of movement for portions of the tipping mechanism 200 as described more fully below. The tipping mechanism 200 also includes a bifurcated generally Y-shaped lifting arm 252 formed from a cross bar 254 welded to a pair of parallel lifting members 256. Intermediate diagonal lifting members 258 are welded between the cross bar 254 and lifting members 256 to provide additional structural integrity to the lifting arm 252. The ends 260 of the lifting members 256 opposite cross bar 254 are secured to a transversely extending slide bar 262. The slide bar 262 carries a pair of roller assemblies 264 at its opposite ends 266 and 268, which in turn are movably retained within and operative to be guided by guide tracks 250. The central portion 270 of the slide bar 262 has assembled to it an adjustable connector 272 as shown in FIG. 12. The connector defines an end portion 274 which is received and welded to a cylindrical sleeve 276, which in turn is connected to the rod end 278 of a hydraulic cylinder 280. The end 282 of the hydraulic cylinder 280 opposite rod end 278 is also connected to a bifurcated fixture 284 by way of a pin 286. The tipping mechanism 200 further includes spaced parallel linkages 290 which are pivotally connected at their ends 292 to the inboard faces 293 of lifting members 256 of bifurcated lifting arm 252. The opposite ends 294 of each of the linkages 290 are also pivotally secured to pivot posts 296 depending upwardly from base plate 240 as shown in FIGS. 11 and 12.

The tipping mechanism 200 is utilized by activating hydraulic cylinder 280 to retract rod end 278 and effect movement of slide bar 262 and rollers 264 within guide tracks 250 toward their phantom positions shown in FIG. 11. Such movement will effect an upward scissoring action of lifting arm 252 and linkages 290 to generate and apply a lifting force through the lifting arm 252 to the support rails 146' and 148' of pivot platform 140' for moving platform 140' from its normal rest position shown in solid lines to the phantom position shown in FIG. 11. To effect a relatively smooth tipping motion, the opposite ends of cross bar 254 are provided with lifting rollers 300 which engage and roll along the under surfaces 302 and 304 of support rails 146' and 148' as the scissoring action of the lifting arm 252 and linkages 290 progresses. L-shaped flanges 306 are carried upon undersurfaces 302 and 304 to facilitate location of rollers 300, and to engage rollers 300 to assist in downward movement of pivot platform 140' to its original position when desired. As shown in FIGS. 11 and 12, the dimensions of each of flanges 306 is such that rollers 300 will not interfere with pivotal movement of platform 140' about pivot pins 152 to eject a container from platform 140' through indexing station 42 onto lower container pathway 45.

A side-by-side material flow system in accordance with another embodiment of the invention is identified by reference numeral 310 in FIG. 15, and various portions of system 310 are illustrated in Figures 15 through 22. The side-by-side system 310 comprises a first set of structural modules 312 assembled in a series relationship, and a loading station module 314 operative to define a full container loading station 316 as shown in FIGS. 15 and 16. The modules 312 include spaced transverse horizontal rail supports 318, each of which is displaced vertically relative to adjacent rail supports 318. The rail supports 318 cooperate to support a pair of transversely spaced parallel elongated flow rails 320 of the previously described type so as to define an inclined full container pathway 322 extending in a generally downwardly direction from loading station 316 to a full container indexing station 324 as shown in FIG. 16. The system 310 further includes a second state of structural modules 326 assembled in series relationship and laterally of modules 312, and unloading station module 328 operative to define an empty container unloading station 330 disposed laterally adjacent the full container loading station 316 as shown in FIGS. 15 and 17. The modules 326 include spaced transverse horizontal rail supports 332, each of which is displaced vertically relative to adjacent rail supports 332. The rail supports 332 cooperatively support a pair of transversely spaced elongated parallel flow rails 334 of the previously described type to define an empty container pathway 336 which extends in a generally downward direction from an empty container indexing station 338 toward and to the empty container unloading station 330 in the manner shown in FIG. 17.

The system 310 is also comprised of a container indexing and transfer system 340, which is shown in schematic form in FIGS. 15 through 17, and in more detail in FIGS. 18 through 22. The transfer system 340 includes a three-dimensional system supporting structure 342 defined by spaced parallel vertically extending rectangular end frames 344 and 346, and a cross frame structure 348 as shown in FIGS. 15 through 17. The supporting structure 342 is dimensioned to encompass a full container receiving station 350 located adjacent to the full container indexing station 324, as well as adjacent to an assembly line work station W' so that workers can access full containers at station 350 and remove parts therefrom for delivery to work station W'. The supporting structure 342 also encompasses an empty container delivery station 352 disposed above and laterally of full container receiving station 350 and adjacent empty container indexing station 338 as shown in FIGS. 15 and 17.

The transfer system 340 also includes a transfer mechanism 353 comprised of several subsystems operative to perform several distinct container manipulation and transfer maneuvers to achieve movement of empty containers from receiving station 350 to delivery station 352 for indexing to station 338 and onto pathway 336 for accumulation and storage. Generally speaking, the transfer mechanism 353 includes a pivot platform 354 which supports a pair of spaced parallel elongated flow rails 355 of the previously described type which facilitate gravity flow movement of containers onto and from the transfer mechanism 353 as described hereinafter. The pivot platform 354 is supported above a slide platform 356, which in turn is supported above a lifting platform assembly 358 by way of a pair of spaced parallel elongated transversely extending flow rails 359 of the previously described type, and which are operative to achieve gravity flow movement of both slide platform 356 and pivot platform 354 from station 350 in a lateral direction toward station 352. Each of these subsystems of transfer mechanism 353 and their associated components will be described more fully below.

To achieve such lateral movement of slide platform 356 and pivot platform 354, the transfer mechanism 353 includes a tilting system operative to lift and tilt the lifting platform 358. As shown most readily in FIGS. 18 and 19, the tilting system is comprised of a movable vertical frame 360 operative to reciprocate vertically in spaced parallel opposed tracks 362 welded to the inside vertical faces 363 of end frame 344 of support structure 342. The vertical frame 360 is operative to be guided along tracks 362 by way of a first set of roller assemblies 364 located at spaced vertical locations along the outer sides of the frame 360. These roller assemblies 364 are similar in design and function to that of roller assemblies 84, 86, 92 and 94 of the previously described embodiment, and are operative to locate and retain the movable frame 360 within the volume of end frame 344 during vertical reciprocation of the frame 360 within tracks 362. A second set of double roller assemblies 366 are provided at spaced vertical locations along the opposite vertical sides of frame 360, and are operative to roll along tracks 362. Roller assemblies 366 function in the same fashion as the roller assemblies 98, 100, 104 and 106 of the previously described embodiment to prevent the movable frame 360 from skewing or rotating about an axis extending normally of end frame 344 during reciprocal movement of frame 360 along tracks 362. The movable frame 360 is also provided with a pair of spaced bifurcated downwardly depending tongues 368 shown most readily in FIG. 18, and which receive spaced depending legs 370 on lifting platform 358 to effect a pivotal connection of and thus movement of the lifting platform 358 with movable frame 360 by way of pivot pins 372.

The tilting system also includes a hydraulic lifting cylinder 376 having a rod end 378 which is received wihin a pivot sleeve 379, which in turn is operatively connected by an adjustable bolt connection 380 to a depending horizontal leg 382 welded to movable frame 360. The pivot sleeve 379 is pivotally connected to rod end 378 by way of a pivot pin 383 as shown in FIG. 18. The opposite top end 384 of lifting cylinder 376 is pivotally connected to a fixture 386 welded to a cross member 388 of the vertical end frame 344 of support structure 342, and is pivotally connected thereto by way of a pivot pin 390. Through the provision of the above design, the hydraulic lifting cylinder 376 is operative to vertically reciprocate the movable frame 360 relative to the supporting structure 342, and to thus elevate and lower lifting platform 358 at its end 392 adjacent the movable frame 360.

Figure 19:
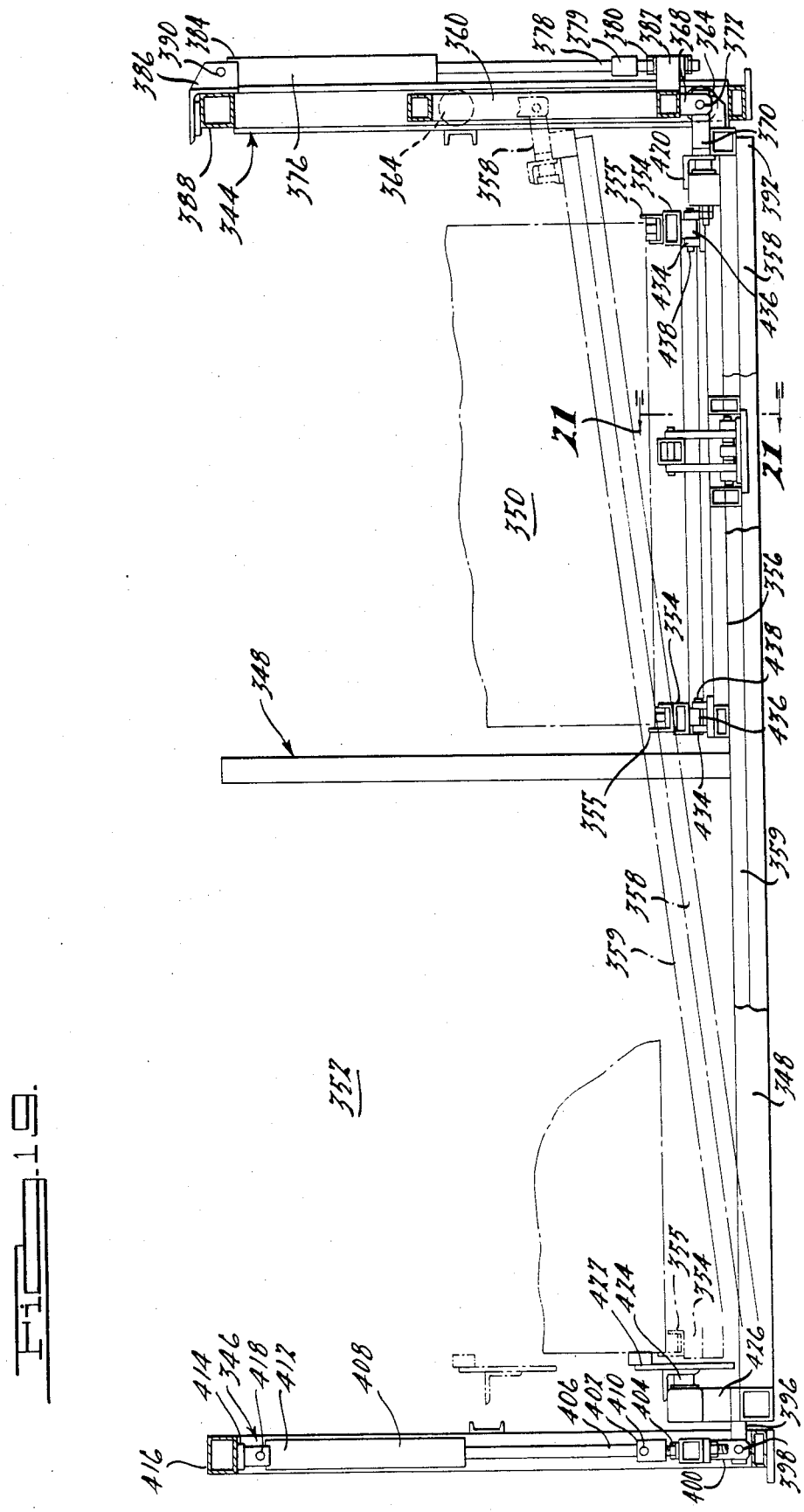
FIG. 19 is an end elevational view, with portions broken away, and partially in phantom, taken generally in the direction of Arrow 19 in FIG. 15.

The opposite end 394 of the lifting platform 358 is provided with a depending leg 396 pivotally connected by way of a pivot pin 398 to a bifurcated pivot linkage 400 in the manner shown in FIGS. 19 and 20. The pivot linkage 400 is in turn assembled to a sleeve 402 by way of an adjustable bolt assembly 404. The sleeve 402 receives the rod end 406 of a second hydraulic lifting cylinder 408, and is pivotally connected to rod end 406 by way of a pivot pin 410. The opposite top end 412 of lifting cylinder 408 is in turn pivotally connected to a pivot fixture 414 welded to the top cross member 416 of vertical end frame 346 by way of pivot pin 418. In this manner, end 394 of the lifting platform 358 is operative connected to the end frame 346 of supporting structure 342 for support thereby. On the other hand, the pivotal connection of leg 396 to cylinder 408 at end 394 of lifting platform 358 through the above-described linkage, as well as the pivotal connection of the top end 412 of lifting cylinder 408 to the cross member 416 of vertical frame 346, enables the lifting platform 358 to tilt as the hydraulic cylinder 376 at the opposite end of the structure 342 lifts the movable frame 360 and end 392 of lifting platform 358.

This feature of transfer mechanism 353 enables the transfer of slide platform 356, as well as pivot platform 354 and any container supported thereupon, by way of gravity flow along flow rails 359 of lifting platform 358 from the container receiving station 350 to the opposite end of the supporting structure 342 at a point disposed below container delivery station 352. Once this transfer operation has been achieved, the movable frame 360 and end 392 of the lifting platform 358 can thereafter be lowered to place the lifting platform 358 in a horizontal position. Thereafter, hydraulic lifting cylinders 376 and 408 can be simultaneously activated to raise lifting platform 358, as well as slide platform 356, pivot platform 354, and a container supported thereupon, to achieve vertical movement of the entire assembly and the container to delivery station 352 such as shown in phantom in FIG. 20. To facilitate container positioning, as well as the supporting assembly therefor, and to absorb loads created by lateral transfer along lifting platform 358 of the supporting platform hardware, the lifting platform 358 is provided with shock absorbers 420 at end 392 thereof, as well as a pair of impact plates 422 carried upon spaced shock absorbers 424 mounted to a U-shaped retaining bar 426 welded to the opposite end 394 of platform 358. The shock absorbers 420 and 424 and impact plates 422 are similar in design and function to those of the previously described embodiment, and will thus not be described hereinafter.

The indexing of full containers from station 324 to container receiving station 350, as well as the indexing of empty containers from delivery station 352 to station 338, is facilitated by use of the pivot platform 354 shown most readily in FIGS. 18 through 22. The pivot platform 354 is freely supported above end 430 of the slide platform 356 by a locating channel 432 shown in FIGS. 20 and 21. Pivot platform 354 is supported above the opposite end 433 of slide platform 356 by way of spaced bifurcated pivot fixtures 434 which receive tongues 436 depending downwardly from pivot platform 354. The tongues 436 are pivotally connected to fixtures 434 by pivot pins 438 so that the entire pivot platform 354 is operative to pivot relative to slide platform 356 about the axis defined by pins 438. As shown in FIGS. 18 and 21, the pivot fixtures 434 and the locating channel 432 are dimensioned to normally support the pivot platform 354 above slide platform 356 at an inclined angle which matches the inclination of flow rails 320 along full container pathway 322. The normally supported position of pivot platform 354 thus facilitates the indexing of full containers from indexing station 324 by gravity flow onto flow rails 355 on pivot platform 354 and to the receiving station 350. In this regard, the receipt of full containers and positioning thereof at receiving station 350 is facilitated through the provision of impact plate-shock absorber assemblies 439 similar in design and function to those of the previously described embodiment. To control indexing of full containers onto pivot platform 354, the structural module 312 which encompasses indexing station 324 can be provided with positive stop mechanisms for holding containers at station 324 prior to indexing.

When pivot platform 354 and slide platform 356 have been transferred to delivery station 352 by the lifting platform 358, it is necessary to angularly reposition platform 354 to enable gravity flow of empty containers from flow rails 355 onto flow rails 334 at the empty container indexing station 338. This angular position is illustrated in phantom form in FIG. 20. To achieve such angular repositioning, the transfer system 340 is provided with a platform tilting mechanism 440 shown in FIGS. 21 and 22, and which is supported by slide platform 356 for movement therewith between stations 350 and 352. In this regard, the tilting mechanism 440 comprises a base plate 442 which is supported upon cross channels 444 welded to the slide platform 356. The base plate 442 supports a hydraulic cylinder 446 which powers a push rod 448 for driving a roller assembly 450 along base plate 442 between the position shown in solid and phantom lines in FIG. 21. A linkage member 452 is pivotally connected at one of its ends 454 to the roller assembly 450 for linear movement therewith. The opposite end 456 of the linkage 452 is in turn pivotally connected to a portion of pivot platform 354 as shown in FIGS. 21 and 22. Since the pivot platform 354 is fixed for pivotal movement relative to slide platform 356 about the axis of pins 438, the linkage 452 translates linear movement of push rod 448 and roller assembly 450 into pivotal movement of pivot platform 354. Thus, when the roller assembly 450 and end 454 of linkage 452 are moved by push rod 448 to the phantom position shown in FIG. 21, the linkage 452 will effect movement of pivot platform 354 to the position also shown in phantom in FIG. 21. The tilting mechanism 440 and the component parts thereof are designed and dimensioned so that the phantom position of pivot platform 354 in FIG. 21 will be in angular alignment with flow rails 334 along empty container pathway 336 as shown in FIGS. 17 and 20.

The overall design and function of the material flow system 310 provides the user with the advantages of the previously described embodiment of the invention, and is also well suited for use with the previously described air braking system, close tolerance positioning devices for robotic applications, and priority sensors for automatic guided vehicle applications. In addition, the system 310 of the present embodiment is specifically suited for use in facilities where overhead clearance space is limited. The system 310 is utilized by using a forklift vehicle to load full parts containers at loading station 316. Such full parts containers will automatically flow by way of gravity on flow rails 320 along full container pathway 322 where they will be accumulated and stored for indexing as needed. Each full container is operative to be indexed from indexing station 324 onto pivot platform 354 where it will flow along flow rails 355 to receiving station 350. The receiving station 350 is intended to be situated adjacent an assembly line work station W' so that a line worker can readily access containers as desired for delivery of parts to the work station W'. When the supply of parts from any particular container has been fully depleted, the transfer mechanism 340 can be actuated to effect transfer of the empty container from station 350 to the receiving station 352. Such transfer is effected by utilizing the lifting platform 358 to effect lateral movement of slide platform 356, pivot platform 354 and the empty container to a point below station 352. The lifting platform 358 can thereafter be lifted to move the empty container up to station 352. The operator can thereafter actuate the platform tilting mechanism 440 to tilt pivot platform 354 into angular alignment with flow rails 334 to enable gravity flow of the empty container along flow rails 355 onto flow rails 334. The empty container can thereafter automatically flow by way of gravity on flow rails 334 along empty container pathway 336 toward the unloading station 330. This sequence of operations can be repeated for each container which is stored along the full container pathway 322 so that all of the parts containers which have been loaded upon the system 310 at the beginning of a work shift can be emptied and thereafter accumulated and stored along the pathway 336. At the end of a particular work shift, a forklift vehicle can be utilized to sequentially remove each of the empty containers from unloading station 330. To facilitate the indexing of empty containers from pathway 336 to the unloading station 330, the system 310 can be provided with positive stop mechanisms along pathway 336 as desired.

Other embodiments of storage and delivery systems incorporating the principles of the present invention are illustrated in schematic form in FIGS. 23 and 24. The system 480 shown in FIG. 23 is of a closed loop design and is comprised of a series of structural modules 482 operative to support gravity flow rails of the previously described type in an inclined fashion to define a full container flow pathway 484 extending toward a work station W', and an empty container flow pathway 486 extending generally away from the work station W' and toward a container unloading station 487. The system 480 is provided with a container indexing and transfer mechanism 488 similar in design and function to the transfer mechanism 340 of the previously described embodiment, and which is operative to receive full containers from the pathway 484 for indexing and delivery to the workstation W''', and to transfer empty containers from the workstation W'' onto pathway 486 for gravity flow toward unloading station 487. The system 480 is also provided with a container loading and indexing structure 490 which defines a loading station 492 adjacent unloading station 487, and which is operative to be loaded with full parts containers and to transfer same onto pathway 484.

FIG. 24 illustrates in schematic form a side shuttle type storage and delivery system 500 is particularly adapted for inline transfer of containers along a production line having laterally disposed or side work stations where operations are performed upon the workpieces as they progress down the line. The system 500 includes a series of structural modules 502 operative to support gravity flow rails of the previously described type in an inclined fashion to define an incoming container flow pathway 504 operative to facilitate gravity flow of workpiece containers toward workstation S. The modules 502 also support additional flow rails downline of work station S to define an outgoing flow pathway 506 operative to facilitate gravity flow movement of workpiece containers from the workstation S. The system 500 is also provided with an indexing and transfer system 508 operative to shuttle workpiece containers from pathway 504 to a delivery station 510 adjacent work station S to facilitate access to containers by workers. The transfer system 508 also defines a finished workpiece loading station 512 where workpieces can be reloaded onto a container after operations have been performed thereto at the work station S, and is operative to shuttle containers of such finished workpieces onto pathway 506 for gravity flow movement toward either a container unloading station or a succeeding work station at a later point along the production line. The indexing and transfer system 508 can alternatively be designed to provide for inline or back and forth shuttling to and from work station S in the manner shown in phantom in FIG. 24 using lifting and slide platforms similar to platforms 356 and 358 of the previously described embodiment 310 of the invention. The principles of the side shuttle system 500 can also be applied to the previously described over-under system 10 and side-by-side system 310, as well as the under-over system 520 described hereafter, to enable containers disposed along flow pathways of such systems to be shuttled laterally to an intermediate side work station as desired.

An embodiment of an under-over type container storage and delivery system in accordance with the teachings of the present invention is shown in FIG. 25 at 520. The system 520 is comprised of a series of structural support modules 522 operative to support a pair of spaced parallel elongated lower flow rails 524 of the previously described type in an inclined fashion to define a full container gravity flow pathway 526 extending toward a full container indexing station 527. The modules 522 also cooperatively support a similar pair of spaced parallel elongated upper flow rails 528 in an inclined fashion to allow for gravity flow of empty containers from an empty container indexing station 529 along an empty container gravity flow pathway 530 shown in FIG. 25.

The system 520 is also provided with an indexing and transfer system 532 similar in design and function to that of the transfer system 13 of the previously described embodiment. The transfer system 532 includes a platform assembly 534 operative to be reciprocated vertically in a vertical frame structure 535 between a full container receiving station 536 located adjacent a work station W'''; and an empty container delivery station 538 disposed vertically above station 536 and adjacent indexing station 529. The platform assembly 534 includes a pivotally supported pivot platform 540 which supports a pair of spaced parallel flow rails 542 of the previously described type. The normal resting position of pivot platform 540 and flow rails 542 is such that flow rails 542 will be angularly aligned with lower flow rails 524 to facilitate indexing of containers from station 527 onto the platform assembly 534 by way of gravity flow. The transfer system 532 is also provided with a tilting system 544 which is carried by and movable with platform assembly 534. Tilting system 544 is similar in design to the previously described tilting system 440, and is thus operative to tilt the pivot platform 540 from its normal resting position shown in Figure 25 to the position shown in phantom at delivery station 538, for angularly aligning flow rails 542 with upper flow rails 528 to facilitate indexing and delivery of empty containers from delivery station 538 on platform assembly 534 to indexing station 529 along the empty container pathway 530.

The under-over system 520 is also provided with a second transfer system 546 adjacent the opposite end of the structure from transfer system 532, and which also includes a platform assembly 548 similar in design and function to that of the previously described platform assembly 62. The platform assembly 548 is operative for vertical reciprocation within a vertical frame structure 549 between an empty container receiving and unloading station 550 shown in phantom in FIG. 25 for receiving empty containers from an indexing station 551 along pathway 530, and a full container loading station 552 disposed vertically below unloading station 550. The platform assembly 548 is provided with a pivot platform 554 which supports a pair of spaced parallel gravity flow rails 556 of the previously described type to facilitate flow of containers onto and from the platform assembly 548 by way of gravity flow. The pivot platform 554 is supported in a normal resting position shown in phantom in FIG. 25 wherein flow rails 556 are aligned angularly with upper flow rails 528. Movement of platform assembly 548 from unloading station 550 to loading station 552 will, however, bring pivot platform 554 into engagement with an upstanding channel 558 supported above the floor of the production facility and which will cause the pivot platform 554 to pivot into angular alignment with the lower flow rails 524 as shown in the solid lines in FIG. 25.

The system 520 is particularly suited for use with slave pallets shown in FIG. 25 at 560 which are operative to support containers C for movement along both of the flow pathways 526 and 530, as well as onto and from platform assemblies 532 and 546. The system 520 is designed to be utilized with such slave pallets 560 in the following manner. A forklift vehicle can be used to load full parts containers onto the system 520 by sequential delivery of same onto slave pallets 560 at the loading station 552. Each such containers and its associated slave pallet 560 will thereafter flow along the full container pathway 526 toward indexing station 527. Through the use of positive stop mechanisms provided at station 527, each such full container and its slave pallet 560 can be indexed to receiving station 536 on platform assembly 532, where workers can access the container for delivering parts to work station W'''' as desired. When the supply of parts from each such container has been fully depleted, the empty container and its associated slave pallet 560 can be moved by the platform assembly 534 from station 536 vertically upward to station 538. Thereafter, the tilting mechanism 544 can be utilized to effect pivotal movement of flow rails 542 into angular alignment with upper flow rails 528 for indexing the empty container and slave pallet 560 to station 529. Each such empty container and its associated slave pallet 560 can thereafter flow along the empty container pathway 530 for accumulation and storage thereupon. Empty containers can be unloaded as desired by sequentially indexing such containers and their associated slave pallets 560 onto the platform assembly 548 to unloading station 550 where the containers can be unloaded with a forklift vehicle. The transfer system 546 is operative to move platform assembly 548 and slave pallets 560 from unloading station 550 vertically downward to loading station 552 where full containers can be loaded onto slave pallets 560 for processing by the system.

It is understood that the foregoing description is that of the preferred embodiments of the invention and that various changes and modifications may be made thereto without departing from the spirit and scope of the invention as defined in the appended claims.

What is claimed is:

1. A container storage and a delivery system for accumulating and storing work piece containers and for delivering said work piece containers to a work station comprising, a longitudinally extending support structure defining at one end thereof said work station and at the other end thereof a container loading station and a container unloading station, said loading station being disposed laterally of said unloading station, a first set of elongated flow rails communicating with said container loading station and supported in an inclined fashion by said support structure to define a first container pathway extending downwardly from said container loading station, with said first set of flow rails being operative to support said containers for flow along said first container pathway by way of gravity from said container loading station to facilitate storage and accumulation of said containers along said first container pathway, a second set of elongated flow rails communicating with said container unloading station and supported in an inclined fashion by said support structure to define a second container pathway for accumulating and storing said containers, with said second set of flow rails being operative to support said containers for flow along said second container pathway by way of gravity toward said container unloading station, said first container pathway extending along said support structure laterally of said second container pathway, and a container transfer mechanism operative to index and transfer said containers from said first container pathway to said work station, to move and index said containers from said work station to said second container pathway for gravity flow therealong in the direction of said container unloading station, and to laterally transfer said containers from said first to said second container pathway, said pathways extending longitudinally along said support structure from said loading and unloading stations at said one end and said transfer mechanism at said other end, said first container pathway defining a container indexing station adjacent said transfer mechanism, and said second container pathway defines a container receiving station adjacent said transfer mechanism, said container receiving station being laterally of and above said container indexing station, said transfer mechanism including a lifting platform assembly extending laterally between said container indexing station and said container receiving station and operative to be reciprocated along a vertical frame structure between said container indexing station and said container receiving station, and a container platform supported upon said lifting platform assembly for receiving containers indexed from said container indexing station and supporting said containers during transfer of said containers to said work station and from said work station to said container receiving station, said container platform including a third set of elongated flow rails operative to support containers for gravity flow movement onto said container platform from said container indexing station and from said container platform to said container receiving station, said container platform being supported upon said lifting platform assembly in a normal resting position with said third set of flow rails disposed at an angle of slope relative to horizontal which matches the angle of slope of said first set of flow rails to facilitate gravity flow movement of containers from said container indexing station onto said container platform, said container platform being supported upon said lifting platform assembly by an intermediate slide platform assembly for pivotal movement about a pivot axis, with said slide platform assembly including means for pivoting said container platform about said pivot axis from said normal resting position to an indexing position wherein said third set of flow rails are disposed at an angle of slope relative to horizontal which matches the angle of slope of said second set of flow rails, and said lifting platform assembly being operative to move said slide platform assembly and said container platform to place said third set of flow rails in alignment with said second set of flow rails to facilitate gravity flow movement of containers from said container platform to said container receiving station, said lifting platform assembly including a fourth set of flow rails which support said slide platform assembly and said container platform for gravity flow movement in a lateral direction extending from said container indexing station to said container receiving station, and said transfer mechanism includes means for lifting the end of said lifting platform assembly adjacent said container indexing station to effect such gravity flow movement of said slide platform assembly and said container platform along said fourth set of flow rails.

* * * * *

UNITED STATES PATENT AND TRADEMARK OFFICE
CERTIFICATE OF CORRECTION

PATENT NO. : 4,815,914

DATED : March 28, 1989

INVENTOR(S) : Michael J. O'Brien

It is certified that error appears in the above-identified patent and that said Letters Patent is hereby corrected as shown below:

On the title page:

Abstract lines 13 and 14, After "containers" insert --from--;

Column 1, line 36, "number" should be --numbers--;

Column 1, line 51, "station" should be --stations--;

Column 3, line 1, "includes" should be --include--;

Column 3, line 14, "mechanism" should be --mechanisms--;

Column 6, line 52, "102" should be --120--;

Column 7, line 28, "from" should be --for--;

Column 7, line 35, "cylinder" should be --cylinders--;

UNITED STATES PATENT AND TRADEMARK OFFICE
CERTIFICATE OF CORRECTION

PATENT NO. : 4,815,914
DATED : March 28, 1989
INVENTOR(S) : Michael J. O'Brien

It is certified that error appears in the above-identified patent and that said Letters Patent is hereby corrected as shown below:

Column 7, line 44, "Fig." should be --Figs.--;

Column 8, line 42, "removed" should be --moved--;

Column 9, line 26, "85" should be --86--;

Column 12, line 57, "state" should be --set--;

Column 14, line 13, "wihin" should be --within--;

Column 14, line 25, "elvevate" should be --elevate--;

Column 14, line 40, "operative" should be --operatively--;

Column 17, line 3, "W'" should be --W"--;

UNITED STATES PATENT AND TRADEMARK OFFICE
CERTIFICATE OF CORRECTION

PATENT NO. : 4,815,914

DATED : March 28, 1989

INVENTOR(S) : Michael J. O'Brien

It is certified that error appears in the above-identified patent and that said Letters Patent is hereby corrected as shown below:

Column 17, line 4, "W'" should be --W'--;

Column 17, line 20, After "500" insert --which--;

Column 18, line 13, "W" "; should be --W''',--;

Column 19, line 3, "containers" should be --container--;

Signed and Sealed this

Fifth Day of June, 1990

Attest:

HARRY F. MANBECK, JR.

Attesting Officer

Commissioner of Patents and Trademarks